(12) United States Patent
Chiba et al.

(10) Patent No.: US 11,467,904 B2
(45) Date of Patent: Oct. 11, 2022

(54) STORAGE SYSTEM AND CONTROL METHOD OF THE SAME

(71) Applicant: Hitachi, Ltd., Tokyo (JP)

(72) Inventors: Takeru Chiba, Tokyo (JP); Hiroki Fujii, Tokyo (JP); Yoshiaki Deguchi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 17/201,151

(22) Filed: Mar. 15, 2021

(65) Prior Publication Data

US 2021/0382788 A1  Dec. 9, 2021

(30) Foreign Application Priority Data

Jun. 3, 2020 (JP) ............................... JP2020-96794

(51) Int. Cl.
*G06F 11/10* (2006.01)
*G06F 11/14* (2006.01)

(52) U.S. Cl.
CPC ...... *G06F 11/1076* (2013.01); *G06F 11/1469* (2013.01); *G06F 2201/85* (2013.01)

(58) Field of Classification Search
CPC .......................... G06F 11/1076; G06F 11/1469
USPC .................................. 714/6.24, 6.3, 6.32, 19
See application file for complete search history.

(56) References Cited

U.S. PATENT DOCUMENTS

| 8,261,016 | B1 * | 9/2012 | Goel ................... | G06F 11/1088 711/113 |
| 9,971,648 | B1 * | 5/2018 | Schneider ........... | G06F 11/1076 |
| 2010/0107003 | A1 | 4/2010 | Kawaguchi | |
| 2010/0223531 | A1 * | 9/2010 | Fukutomi ............. | G06F 11/108 714/764 |
| 2013/0339601 | A1 * | 12/2013 | Goel ....................... | G06F 12/02 711/114 |
| 2014/0325262 | A1 * | 10/2014 | Cooper ................ | G06F 11/108 714/6.22 |
| 2015/0169408 | A1 * | 6/2015 | Hallak ................ | G06F 11/1092 714/770 |
| 2015/0324145 | A1 * | 11/2015 | Akutsu ................ | G06F 3/0617 711/114 |

FOREIGN PATENT DOCUMENTS

WO  WO-2005052784 A2 * 6/2005 .......... G06F 11/1096

* cited by examiner

*Primary Examiner* — Chae M Ko
(74) *Attorney, Agent, or Firm* — Mattingly & Malur, PC

(57) ABSTRACT

A storage system including a storage controller and a plurality of storage drives generates parity data from data. Data and parity data configure a stripe. A plurality of stripes configure a parity group allocated with a plurality of storage drives to store the parity group. A first parity group allows the number of storage drives allocated to the parity group to be equal to the number of data pieces configuring each stripe. A second parity group allows the number of storage drives allocated to the parity group to be larger than the number of data pieces configuring each stripe and allows data for each stripe to be distributed and stored in different combinations of storage drives. When the first parity group is converted to the second parity group, a storage drive is added so that it is allocated to the parity group. Data is moved to ensure a free area.

10 Claims, 28 Drawing Sheets

FIG.8

| PPG# | VPG# | PROTECTION TYPE | DATA PLACEMENT | STATUS | REALLOCATION POINTER | |
|---|---|---|---|---|---|---|
| | | | | | DATA AREA | SPARE AREA |
| 0x0000 | 0x0000 | 3D1P | TRADITIONAL | NORMAL | N/A | N/A |
| 0x0001 | 0x0001 | 4D2P | TRADITIONAL ->DISTRIBUTED | NORMAL | 0x00001000 | 0x00000000 |
| 0x0002 | 0x1001 | 3D1P | DISTRIBUTED | WARNING | N/A | N/A |
| ... | ... | ... | ... | ... | | |
| GROUP MANAGEMENT TABLE 1001 | | | | | | |

| PPG# | PDEV# | TYPE | SIZE(BLOCK) | STATUS |
|---|---|---|---|---|
| 0x0000 | 0x0000 | SSD | 0x04000000 | NORMAL |
| | 0x0001 | SSD | 0x04000000 | NORMAL |
| | 0x0002 | SSD | 0x04000000 | NORMAL |
| | 0x0003 | SSD | 0x04000000 | BLOCKED |
| 0x0001 | 0x0004 | SAS-HDD | 0x10000000 | NORMAL |
| | 0x0005 | SAS-HDD | 0x10000000 | BLOCKED |
| | 0x0006 | SAS-HDD | 0x10000000 | NORMAL |
| | 0x0007 | SAS-HDD | 0x10000000 | NORMAL |
| | 0x0008 | SAS-HDD | 0x10000000 | NORMAL |
| ... | ... | ... | ... | ... |

PDEV MANAGEMENT TABLE 1002

FIG.10

| VPG# | VDEV# | SIZE(BLOCK) |
|---|---|---|
| 0x0000 | 0x0000 | 0x04000000 |
| | 0x0001 | 0x04000000 |
| | 0x0002 | 0x04000000 |
| | 0x0003 | 0x04000000 |
| 0x1001 | 0x1000 | 0x14000000 |
| | 0x1001 | 0x14000000 |
| | 0x1002 | 0x14000000 |
| | 0x1003 | 0x14000000 |
| ... | ... | ... |

VDEV MANAGEMENT TABLE 1003

FIG.13

PARCEL GROUP MANAGEMENT TABLE 1006

| PARCEL GROUP# 2051 | P-PARCEL# 2052 | V-PARCEL# 2053 | ALLOCATED STORAGE POOL# 2054 | STATUS 2055 |
|---|---|---|---|---|
| 0x0000 | 0x0000 | 0x0000 | 0x01 | NORMAL |
|  | 0x0001 | 0x0001 |  |  |
|  | 0x0002 | 0x0002 |  |  |
|  | 0x0003 | 0x0003 |  |  |
| ... | ... | ... | ... | ... |
| 0x0100 | 0x1000 | 0x0001 | NOT ALLOCATED | WARNING |
|  | 0x1001 | 0x1000 |  |  |
|  | 0x1002 | 0x2000 |  |  |
|  | 0x1003 | 0x0100 |  |  |
| ... | ... | ... | ... | ... |

FIG.14

SPARE CONVERSION TABLE 1007

| SOURCE 2061 |  | DESTINATION 2063 |  |
|---|---|---|---|
| PDEV# | P-PARCEL# 2062 | PDEV# | P-PARCEL# 2064 |
| 3 | 0 | 1 | 100 |
| 3 | 1 | 0 | 102 |
| 3 | 2 | 2 | 101 |
| ... | ... | ... | ... |

FIG.15

| STORAGE POOL# | SIZE(BLOCK) | USAGE | ALLOCATED VIRTUAL GROUP# |
|---|---|---|---|
| 0x00 | 0x000100000000 | 50% | 0x0000, 0x0001, 0x0002 |
| 0x01 | 0x000200000000 | 90% | 0x0003, 0x0005 |
| 0x02 | 0x000300000000 | 30% | 0x1000, 0x1001, 0x1002 |
| 0x03 | 0x000100000000 | 25% | 0x2000 |
| ... | ... | ... | ... |

2071 / 2072 / 2073 / 2074

STORAGE POOL MANAGEMENT TABLE 1008

FIG.16

| VVOL# | SIZE(BLOCK) | VVOL PAGE# | POOL PAGE# |
|---|---|---|---|
| 0x0000 | 0x00100000 | 0x00 | 0x0000 |
| | | 0x01 | 0x0001 |
| | | 0x02 | NOT ALLOCATED |
| | | ... | ... |
| 0x0001 | 0x00020000 | 0x00 | 0x1000 |
| | | 0x01 | 0x2000 |
| ... | ... | ... | ... |

2081 / 2082 / 2083 / 2084

VVOL MANAGEMENT TABLE 1009

FIG.17

| POOL ID | POOL PAGE# | IN THE STORAGE POOL START LBA | V-PARCEL# | IN V-PARCE START LBA |
|---|---|---|---|---|
| #0 | 0x0000 | 0x00000000 | 0x0000 | 0x00001000 |
| #0 | 0x0001 | 0x00000100 | 0x0010 | 0x00002000 |
| #0 | 0x0002 | 0x00000200 | 0x0020 | 0x00003000 |
| #0 | 0x0003 | 0x00000300 | 0x0030 | 0x00004000 |
| #1 | ... | ... | ... | ... |

2091, 2092, 2093, 2094, 2095

POOL PAGE MANAGEMENT TABLE 1010

1. ERROR DURING MOVEMENT FROM D2D AREA

2. ERROR DURING MOVEMENT FROM D2S AREA

STORAGE SYSTEM AND CONTROL METHOD OF THE SAME

CLAIM OF PRIORITY

The present application claims priority from Japanese patent application JP 2020-96794 filed on Jun. 3, 2020, the content of which is hereby incorporated by reference into this application.

BACKGROUND

The present invention relates to a storage device that uses RAID and distributed RAID.

Storage devices use the redundant configuration such as RAID (Redundant Array of Inexpensive Disks). In recent years, capacities of storage media such as HDDs (Hard Disk Drives) and SSDs (Solid State Drives) are increasing.

The increase in the storage media capacity extends the rebuild time after a drive error occurs, causing an issue of extending the maintenance time.

As a method of shortening the rebuild time, for example, U.S. Patent Application Publication No. 2010/107003 proposes the distributed RAID that achieves high-speed rebuild by distributing a read source and a write destination to multiple drives. This publication discloses a technique of converting a mirroring configuration into an Erasure Coding configuration.

SUMMARY

Many storage systems use RAID that uses parity instead of mirroring. However, the above-described conventional example does not disclose easy conversion from a conventional RAID configuration using parity to a distributed RAID configuration.

Therefore, the example causes difficulty in the migration from the conventional parity-based RAID configuration comprised of large-capacity storage media to a distributed RAID that can shorten the rebuild time.

The present invention has been made in consideration of the foregoing. It is therefore an object of the present invention to provide a technology of easily converting conventional parity-based RAID configurations to distributed RAID configurations.

The present invention discloses a storage system that includes a storage controller including a processor and memory and multiple storage drives. Parity data is generated from multiple user data pieces and a stripe is composed of the multiple user data pieces and the parity data. Data (user data and parity data) belonging to the stripe is stored in different storage drives. A parity group is composed of multiple stripes and is allocated with multiple storage drives to store a parity group. A first parity group allows the number of storage drives allocated to the parity group to be equal to the number of data pieces configuring each stripe. A second parity group allows the number of storage drives allocated to the parity group to be larger than the number of data pieces configuring each stripe and allows data for each stripe to be distributed and stored in different combinations of storage drives. When the first parity group is converted to the second parity group, the storage controller adds a storage drive to be allocated to the parity group, moves data pieces belonging to different stripes from each existing storage drive to the added storage drive, and moves data in each of the storage drives to aggregate a free area resulting from movement of the data pieces in the storage drive.

The present invention makes it possible to very easily convert a conventional RAID configuration into a distributed RAID configuration and promote the use of a distributed RAID. Moreover, data can be ensured even if a drive being converted fails.

Details of at least one embodiment of the subject matter disclosed in the present specification are set forth in the accompanying drawings and the description below. Other features, aspects, and effects of the disclosed subject matter are readily ascertained in the disclosure, drawings, and claims below.

BRIEF DESCRIPTION OF THE DRAWINGS

FIG. 8 is a diagram illustrating a parcel group management table according to the first embodiment of the present invention;

FIG. 9 is a diagram illustrating a physical device management table according to the first embodiment of the present invention;

FIG. 10 is a diagram illustrating a virtual device management table according to the first embodiment of the present invention;

FIG. 13 is a diagram illustrating a parcel group management table according to the first embodiment of the present invention;

FIG. 14 is a diagram illustrating a spare conversion table according to the first embodiment of the present invention;

FIG. 15 is a diagram illustrating a storage pool management table according to the first embodiment of the present invention;

FIG. 16 is a diagram illustrating a virtual volume management table according to the first embodiment of the present invention;

FIG. 17 is a diagram illustrating a pool page management table according to the first embodiment of the present invention;

DETAILED DESCRIPTION

Embodiments of the present invention will be described with reference to the accompanying drawings.

First Embodiment

Figure 1:
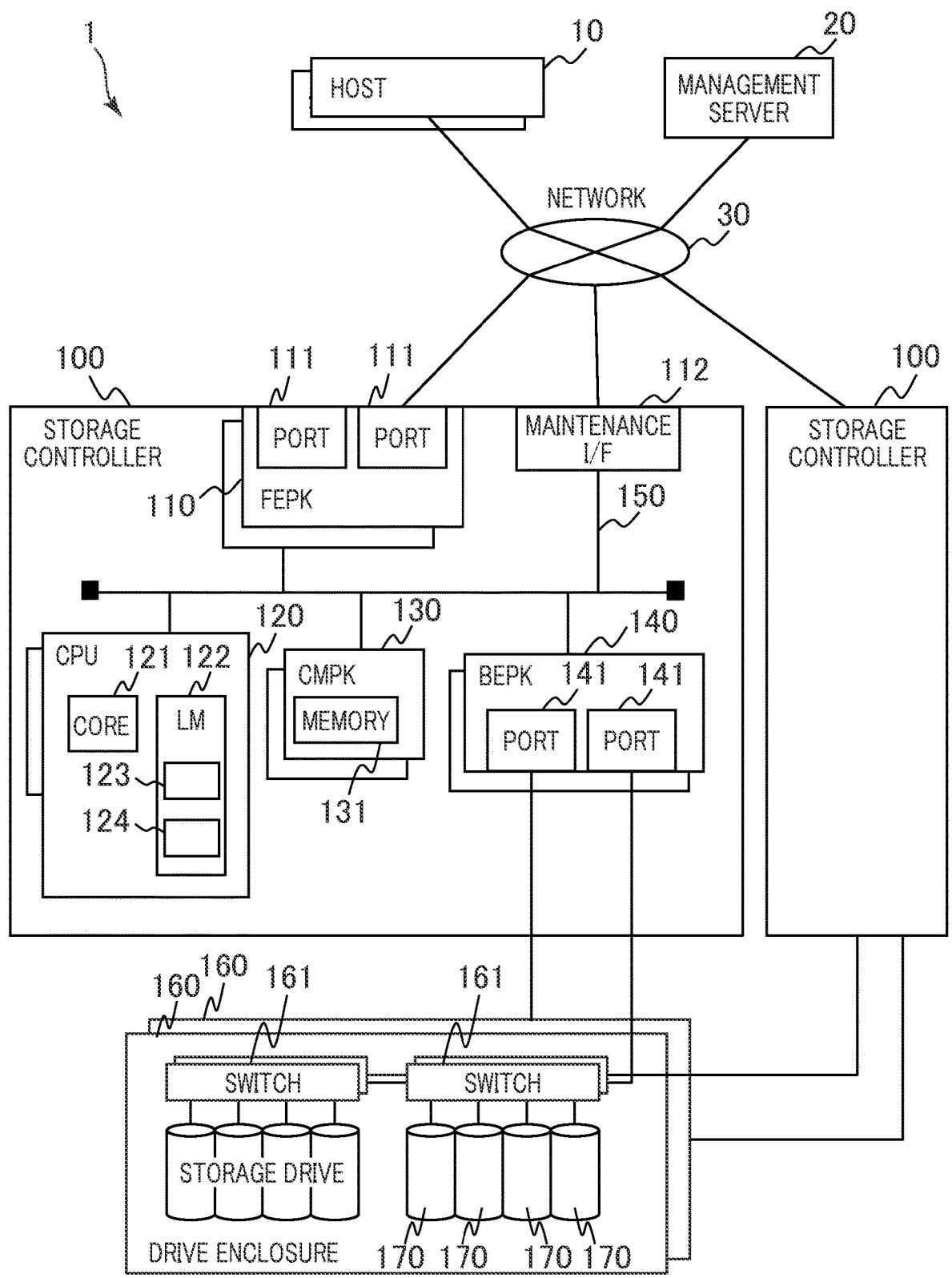
FIG. 1 is a block diagram illustrating a computer system configuration according to a first embodiment of the present invention.

FIG. 1 is a block diagram illustrating the first embodiment of the present invention and the hardware configuration of a computer system.

A computer system 1 includes one or more host computers (hereinafter referred to as hosts) 10, a management server 20, and a storage system. The storage system includes multiple storage controllers 100 and multiple drive enclosures 160 containing the storage drive 170. There is further included a network 30 that connects host 10, the management server 20, and the storage controller 100.

The network 30 may be a local area network (LAN) or a wide area network (WAN). Each of the hosts 10 may be a virtual machine.

The host 10 is, for example, a computer that executes an application. The host 10 reads the data used by the application from the storage drive 170 via the storage controller 100 and writes the data generated by an application to the storage drive 170 via the storage controller 100.

The management server 20 is a computer used by an administrator. The management server 20 accepts administrator manipulations and allows the computer system to perform processes such as a data reallocation process.

The storage controller 100 includes a front-end package (FEPK in the drawing) 110 containing one or more ports 111, one or more maintenance I/Fs 112, one or more CPUs (Central Processing Units) 120, one or more cache memory packages (CMPK in the drawing) 130, a backend package (BEPK in the drawing) 140 including one or more ports 141 and, a network 150.

The front-end package 110, the maintenance I/F 112, the CPU 120, the cache memory package 130, and the back-end package 140 are connected via the network 150.

A port 111 exemplifies an interface with the host 10. The port 111 connects the storage controller 100 to various devices such as the other storage controller 100 via the network 30.

The maintenance I/F 112 provides an interface that connects the storage controller 100 to the management server 20. The port 111 and the maintenance I/F 112 may signify the same thing.

The CPU 120 is a control portion that includes a core 121 to execute arithmetic processing and local memory (LM in the drawing) 122 to store programs, for example. The CPU 120 performs various processes by executing a program stored in the control program storage area 124 of the local memory 122.

The local memory 122 is allocated a control information storage area 123 to store various types of information. The information may be stored in not only the local memory 122 but also cache memory 131 other than the local memory 122.

The cache memory package 130 includes the cache memory 131 that temporarily stores data (write data) written from the host 10 to the storage drive 170 and data (read data) read from the storage drive 170.

The backend package 140 includes the port 141 to connect to the drive enclosure 160. The drive enclosure 160 contains multiple switches 161 and multiple storage drives 170.

The storage drive 170 includes one or more storage media. The storage media include, for example, a magnetic disk (HDD: Hard Disc Drive), flash memory, and other non-volatile semiconductor memory devices (such as PRAM and ReRAM).

The storage controller 100 manages a capacity pool (hereinafter simply referred to as a pool) composed of storage areas in the multiple storage drives 170. The storage controller 100 uses storage areas in the pool to configure a RAID (Redundant Array of Inexpensive Disks) group and a distributed RAID group.

The storage controller 100 can convert a conventional RAID group into a distributed RAID group by using the storage drive 170 in each drive enclosure 160.

The above-described configuration is an example. Any of the host 10, the management server 20, the multiple storage controllers 100, and the multiple drive enclosures 160 may be housed in the same enclosure instead of being networked.

Figure 2:
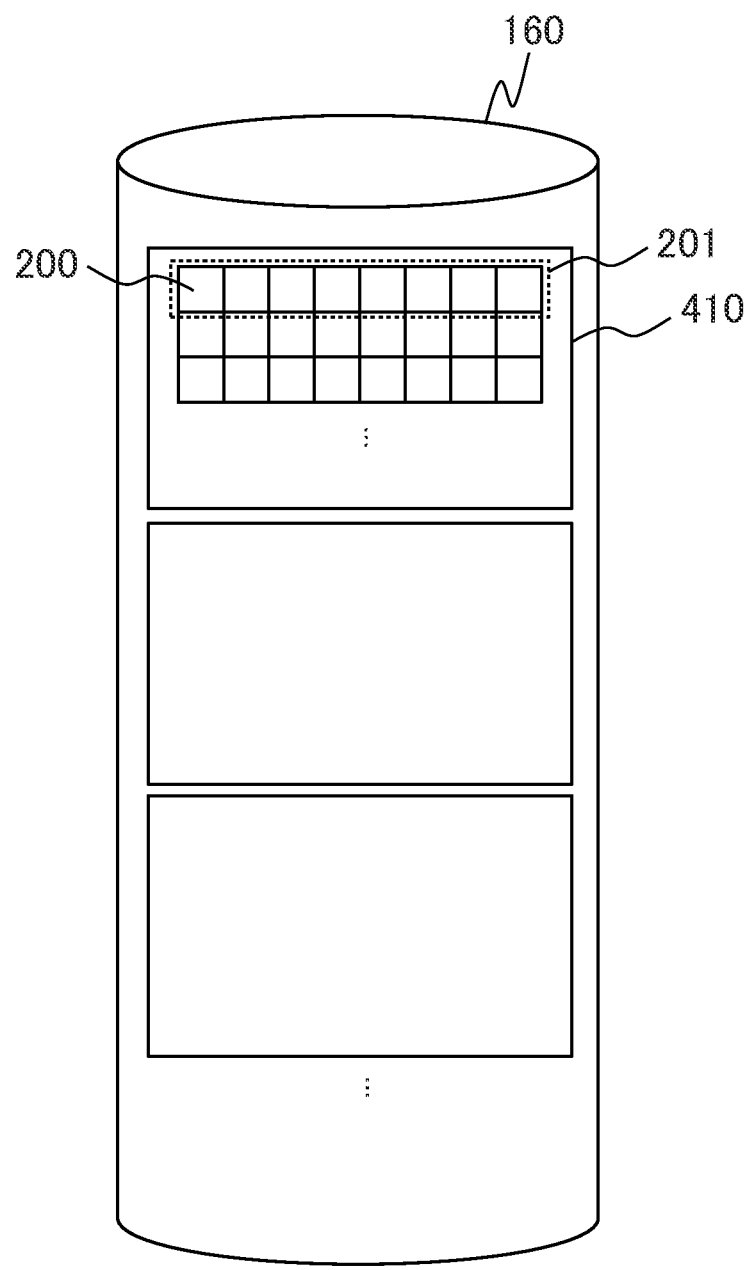
FIG. 2 is a diagram illustrating the data structure of a storage drive according to the first embodiment of the present invention.

FIG. 2 is a diagram illustrating the data structure of a storage area in the drive enclosure 160. A conventional RAID group and a distributed RAID group are similarly composed of multiple sub-storage area sequences. Each sub-storage area sequence is composed of multiple sub-storage areas. The multiple sub-storage areas range over the multiple storage drives 170 configuring a RAID group in the drive enclosure 160 and respectively correspond to the storage drives 170.

One sub-storage area is referred to as a sub-block 200. The sub-storage area sequence is referred to as a stripe block 201. A RAID group storage area (a stripe to be described) is composed of the multiple stripe blocks 201 ranging over the storage drives 170.

The storage controller 100 according to the present embodiment manages a physical parcel 410, namely, an area containing a specified number of stripe blocks 201 stored in the storage drives 170.

The sub-block 200 is composed of 512 bytes, the minimum unit of SCSI command processing, for example. The stripe block 201 is a unit configuring the stripe and is composed of 256 KiB, for example.

The physical parcel 410 is a physical area management unit. The capacity of one physical parcel 410 is set to several tens of MiB, for example. The physical parcel 410 according to the present embodiment illustrates a mixture of the data and the parity in one physical parcel 410. However, there may be separately provided the physical parcel 410 for user data and the physical parcel 410 for parity.

There are several levels of RAID (hereinafter referred to as "RAID levels"). For example, RAID5 allows the host 10 to write user data in data units defined as a predetermined size. Each data unit is divided into multiple data elements. The data elements correspond to multiple stripes in the same stripe and each of the data elements is written to one of the multiple sub-blocks 200 in each stripe block 201.

An error in the storage drive 170 may prevent a data element from being read from the corresponding storage drive 170. To rebuild this data element, RAID5 uses the data elements of multiple user data pieces in each data unit to generate redundant information called "parity" (hereinafter, "parity data"). The parity data uses the same size as the data element of user data. For one data unit, one or more parities are generated depending on the type of RAID. Hereinafter, the data element will be used as a superordinate concept of user data and parity data as a data element.

The parity data is the stripe block 201 belonging to the same stripe as the data element of multiple user data pieces and is written to the sub-block 200 of each stripe block 201. In the present embodiment, the stripe block 201 to store user data is referred to as a "data block" and the stripe block 201 to store parity data is referred to as a "parity block."

For example, suppose four storage drives 170 configure a RAID group. Then, three data elements configuring the data unit are written to three data blocks corresponding to the three storage drives 170. Parity data is written to the parity block corresponding to the remaining one storage drive 170. Hereinafter, the user data as a data element and the parity data may be both referred to as the stripe block 201 when they are not distinguished.

RAID6 generates two types of parity data (P parity and Q parity) for each data unit. These parity data pieces are written to different parity blocks within the same stripe. This makes it possible to restore two data elements from the two types of parity data if it is impossible to read the two data elements out of multiple data elements configuring the data unit.

There are RAID levels other than those described above (such as RAID1 through RAID4). However, the present embodiment aims at RAID using the parity. The example in FIG. 1 illustrates the configuration of two storage controllers 100. However, the configuration may use one storage controller 100 or may be provided as a scale-out configuration that bundles multiple storage controllers 100.

Figure 3:
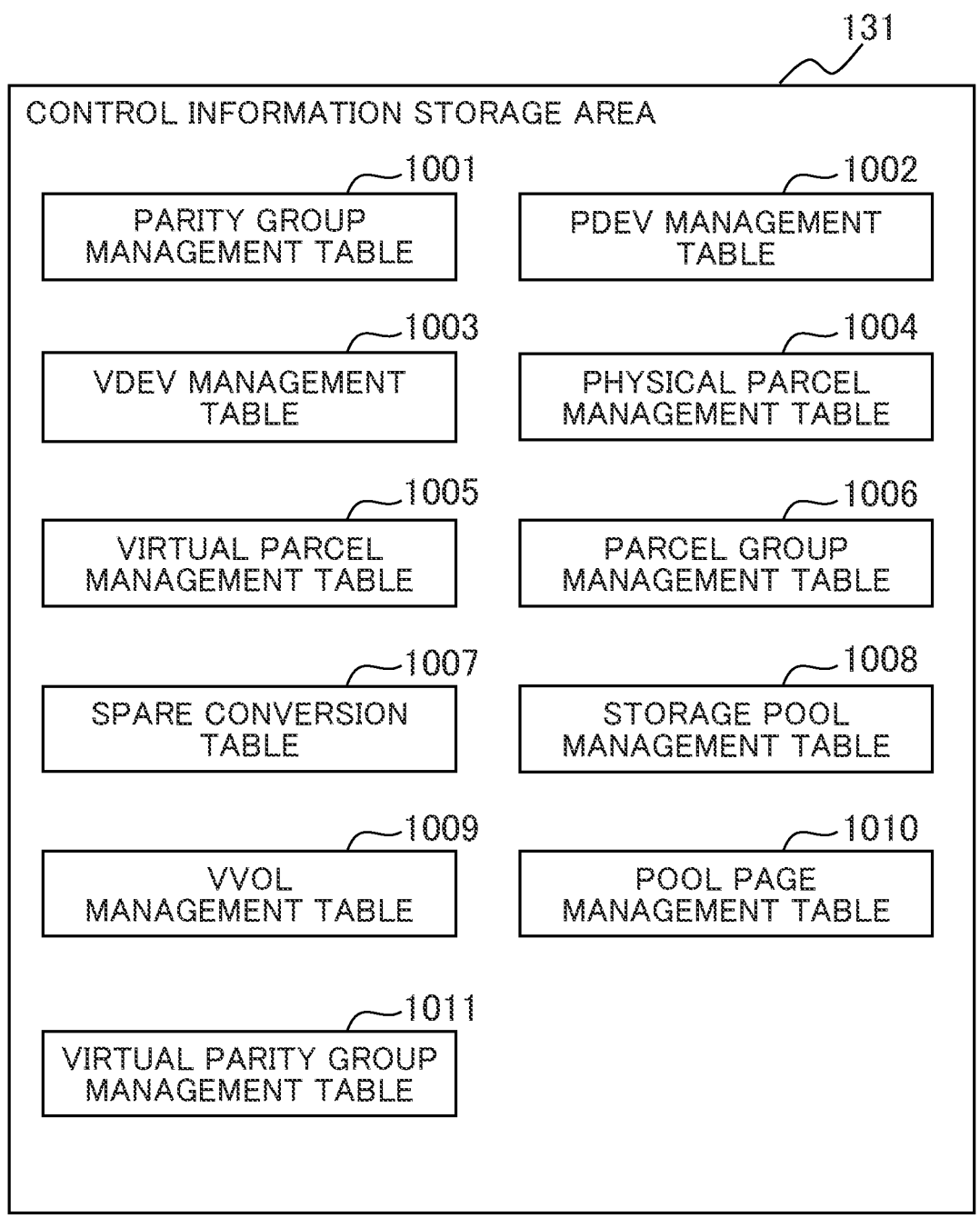
FIG. 3 is a block diagram illustrating a table stored in a control information storage area of local memory according to the first embodiment of the present invention.

FIG. 3 is a block diagram illustrating a table stored in the control information storage area 123 in the local memory 122.

The control information storage area 123 stores a group management table 1001, a physical device (PDEV: Physical DEVice) management table 1002, a virtual device (VDEV: Virtual DEVice) management table 1003, a physical parcel management table 1004, a virtual parcel management table 1005, a parcel group management table 1006, a spare conversion table 1007, a storage pool management table 1008, a virtual volume management table 1009, a pool page management table 1010, and a virtual parity group management table 1011.

When the local memory 122 uses volatile storage media, it is desirable to store the tables in non-volatile storage media (unshown) in the event of a shutdown or power failure. Details of each table will be described later.

Figure 4:
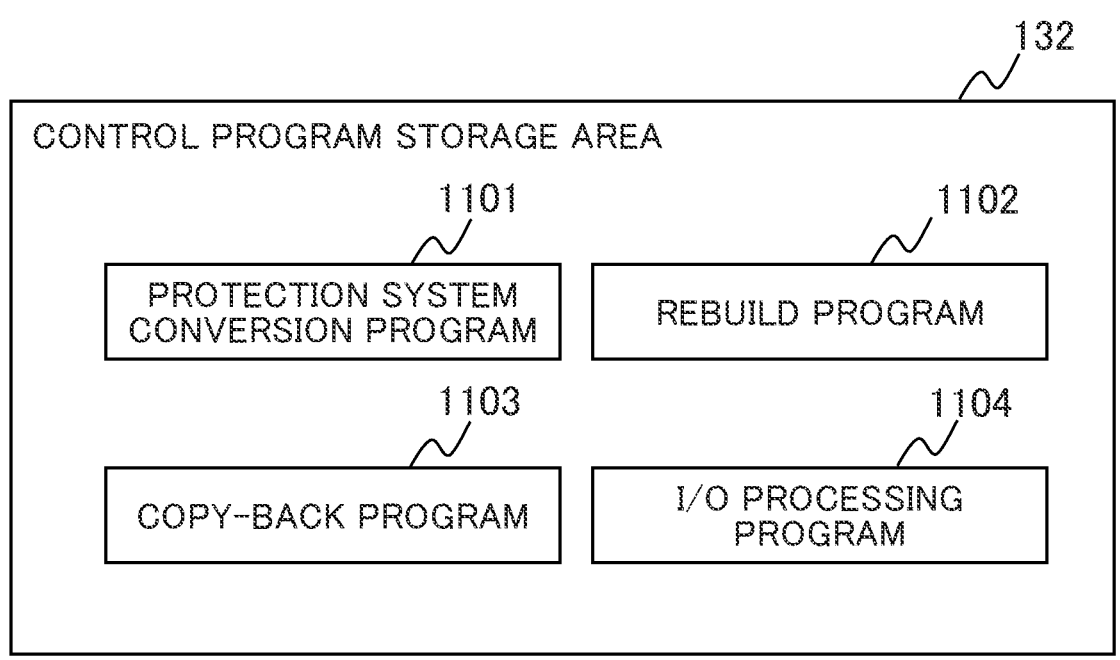
FIG. 4 is a block diagram illustrating programs stored in a control program storage area of local memory.

FIG. 4 is a block diagram illustrating a program stored in the control program storage area 124 in the local memory 122. The control program storage area 124 stores a protection system conversion program 1101, a rebuild program 1102, a copy-back program 1103, and an I/O processing program 1104 that are executed by the core 121.

The protection system conversion program 1101 converts a RAID group into a distributed RAID group and relocates data. The rebuild program 1102 recovers data when the storage drive 170 fails. The protection system conversion program 1101 may convert the distributed RAID group into a traditional RAID group.

When the failed storage drive 170 is replaced with a new storage drive 170, the copy-back program 1103 executes a process of writing data from a spare storage drive 170 or a spare area (to be described) back to the replaced new storage drive 170. The I/O processing program 1104 executes an access request received from host 10. Details of each control program will be described later.

When the local memory 122 uses volatile storage media, the control programs are stored in non-volatile storage media (unshown).

The core 121 operates as a functional portion to provide a predetermined function by executing processes according to the program corresponding to each functional portion. For example, the core 121 functions as a protection system conversion process portion by executing processes according to the protection system conversion program 1101. The same applies to other programs. The core 121 also operates as a functional portion to provide each function of multiple processes executed by each program. A computer and a computer system are comparable to the device and the system including these functional portions.

Figure 5:
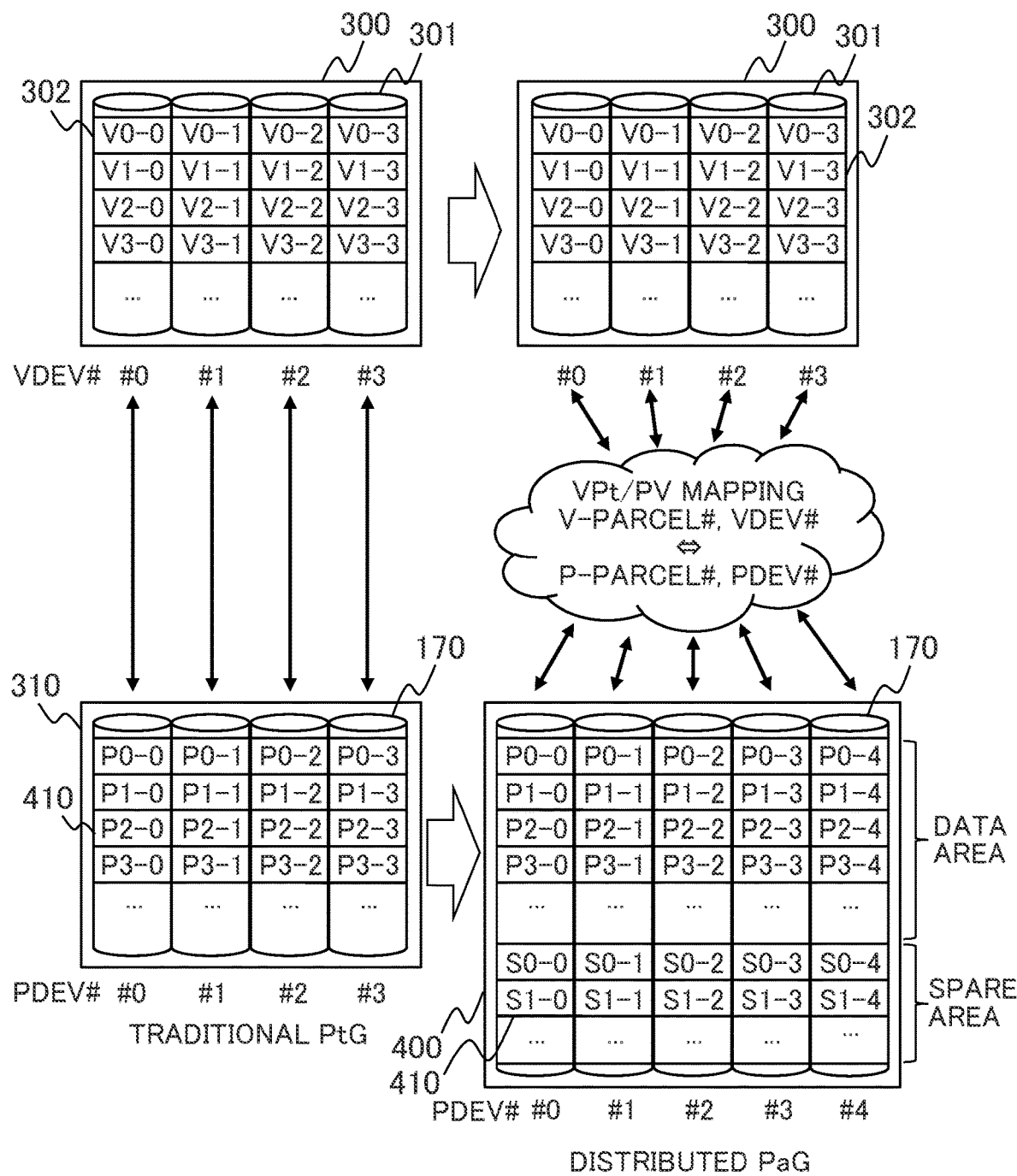
FIG. 5 is a diagram illustrating data mapping between a virtual parity group and a physical parity group or a parcel group according to a conventional.

FIG. 5 is a diagram illustrating the relationship between the virtual parity group and the physical parity group or the parcel group. The example in the drawing converts the RAID configuration of 3D (user data) 1P (parity data) into a distributed RAID configuration by adding a spare (S). The addition is performed at the rate of one S to 3D1P. In this example, the RAID configuration is represented as RAID5 but is not limited thereto.

The RAID configuration before conversion includes the storage drives 170 assigned physical device numbers #0 through #3. Multiple physical parcels 410 are allocated to the storage drives 170. A stripe is composed of stripe blocks (201 in FIG. 2) in the physical parcels 410 allocated to the different storage drives 170. For example, a stripe is composed of stripe blocks in the physical parcels 410 corresponding to P0-0 through P0-3. A physical parity group (Physical Parity Group: PPtG) 310 is composed of the multiple physical parcels 410 on the multiple storage drives 170.

The storage controller 100 provides the host 10 with a virtual parity group (Virtual Parity Group: VPtG) 300, as a storage area, resulting from converting the physical parity group 310. A conventional RAID does not need to configure the virtual parity group 300. However, the virtual parity group 300 is configured for compatibility with the distributed RAID that requires configuring the virtual parity group 300. The virtual parity group 300 is composed of multiple virtual devices (Virtual DEVice: VDEV) 301 (#0 through #3).

The virtual parcel 302 in the virtual parity group 300 according to the RAID configuration corresponds to the physical parcel 410 in the physical parity group. The conventional RAID uses straight mapping, for example. The physical parcel 410 "P0-0" in the physical parity group 310 may correspond to the virtual parcel 302 "V0-0" in the virtual parity group 300.

According to the distributed RAID, the physical parcel 410 in the data area corresponds to the virtual parcel 302. However, the physical parcel 410 in the spare area does not correspond to the virtual parcel 302. A mapping table manages the correspondence. The virtual parity group 300 and the physical parity group are differently sized.

The virtual parity group of distributed RAID is provided as a storage area to the higher-order host 10 correspondingly to the virtual parity group 300 similar to the conventional RAID. Therefore, the number of virtual devices 301 to be configured is comparable to the RAID width (=4) of the conventional RAID. For example, 3D1P configures the virtual parity group 300 by using four virtual devices (VDEVs).

Meanwhile, the parcel group 400 of the distributed RAID is composed of any number of drives greater than or equal to the RAID width of the virtual parity group. Therefore, the parcel group 400 and virtual parity group 300, when corresponding to each other, use different quantities or sizes of physical devices (PDEVs) and virtual devices (VDEVs).

The distributed RAID allows the parcel group 400 to include a data area and a spare area. The data area stores user data and parity data. The spare area stores recovery data during the rebuild. Only the data area, not the spare area, is mapped to the virtual parity group 300. Therefore, there is no virtual parcel corresponding to the parcel (Sx-y in the drawing) in the spare area.

When the number of storage drives 170 increases in the physical parity group 310, the host 10 as a higher layer assumes that the virtual parity group 300 keeps the number of constituent virtual devices unchanged but increases the capacity.

However, it is assumed that the conventional physical parity group 310 and the parcel group 400 of the distributed RAID are composed of the same capacity and the same type of storage drives 170. For example, the configuration may use non-uniform capacities. However, it is impossible to use a fractional area larger than or equal to the minimum drive capacity in the physical parity group 310. The configuration using different types of storage drives 170 is unrecommendable because the lowest-performance drive causes a bottleneck and degrades the entire performance of the physical parity group 310.

The example in the drawing illustrates the one-to-one relationship between the physical parity group and the virtual parity group. However, the virtual parity group may be divided into multiple groups under a given condition and managed as multiple virtual parity groups. Namely, PPaG versus VPaG may be 1:N.

The present embodiment also uses the mapping table to manage the conventional RAID like the distributed RAID. This makes it possible to change from the conventional physical parity group 310 to the distributed parcel group 400 without the need for any access from the host.

Figure 6:
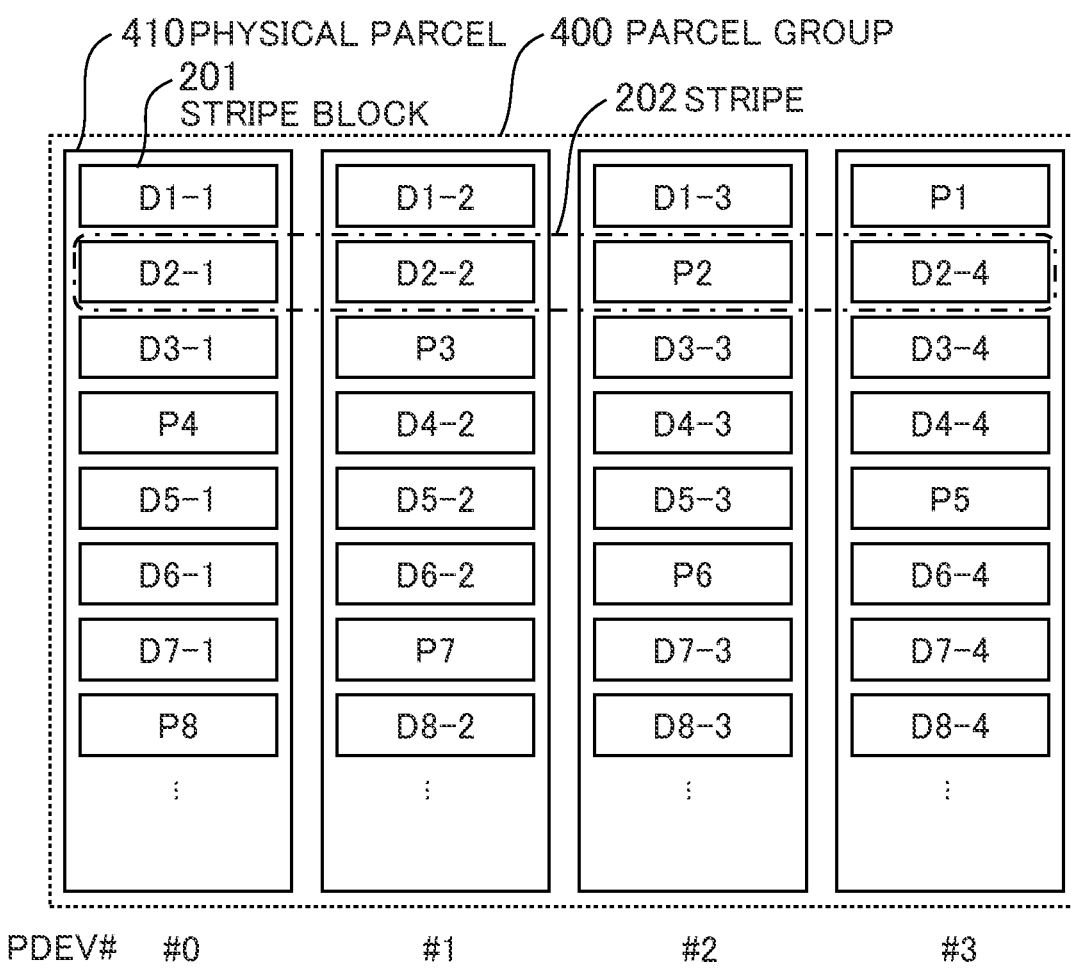
FIG. 6 is a diagram illustrating the configuration in a parcel group according to the first embodiment of the present invention.

FIG. 6 is a diagram illustrating the configuration of a parcel group (a physical parity group of distributed RAID) 400. The parcel group 400 is comprised of multiple physical parcels 410.

Figure 19:
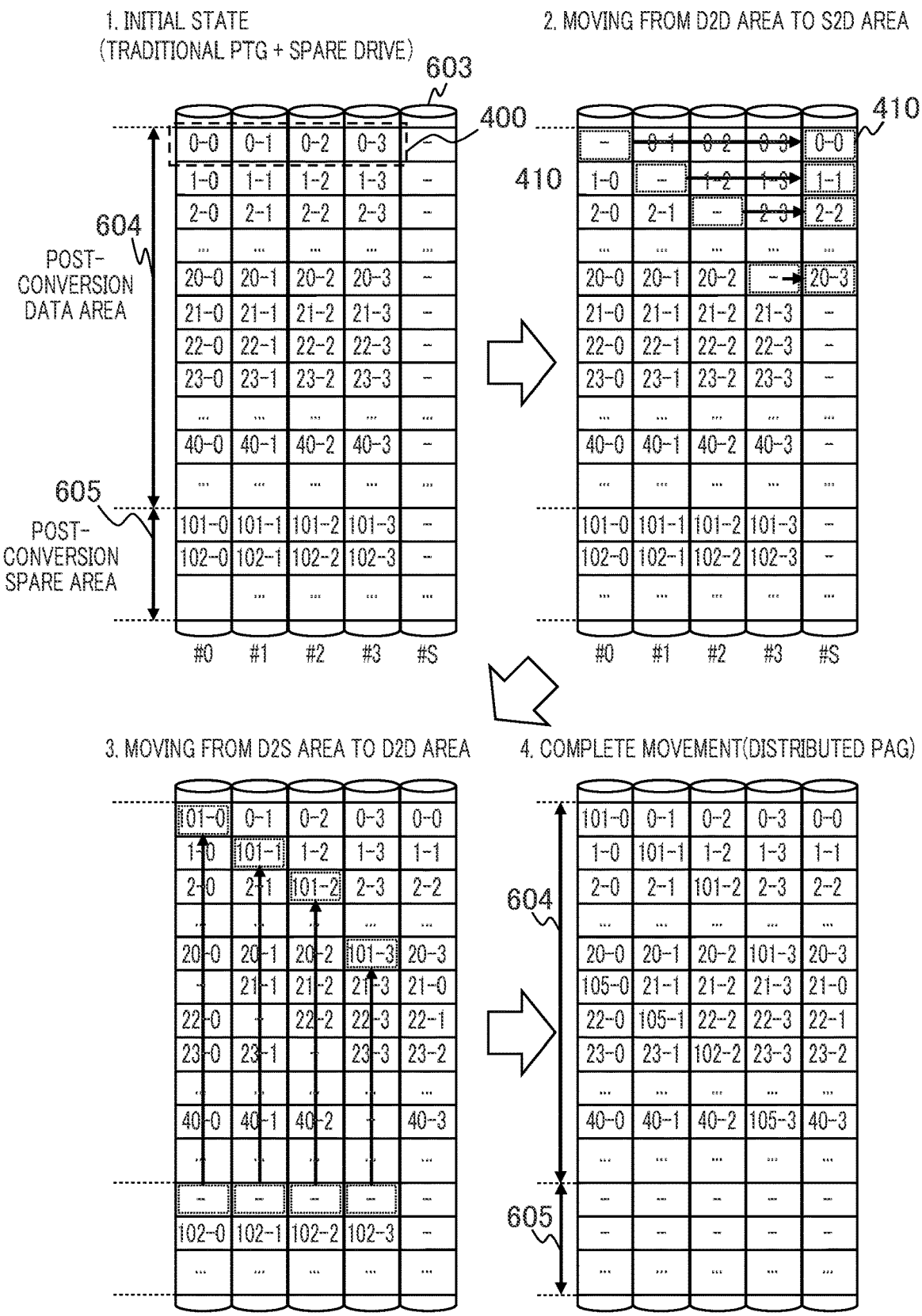
FIG. 19 is a diagram illustrating a process to convert a conventional parity group into a distributed parcel group according to the first embodiment of the present invention.

The example extracts physical parcels 410 belonging to the same parcel group 400. As illustrated in FIG. 19, the physical parcels 410 configuring the actual parcel group 400 are physically distributed to multiple storage drives 170.

The parcel group 400 includes multiple stripe blocks 201 ranging over the storage drive 170 corresponding to the RAID width. For example, the conventional RAID configuration of 3D1P configures the stripe 202 including four stripe blocks 201.

Similarly, the conventional RAID configuration of 3D1P configures one parcel group 400 including four physical parcels 410. One physical parcel 410 includes a predetermined number of (for example, 100) sub-blocks 200 in units of physical devices #0 through #3 illustrated in FIG. 5. The stripe blocks 201 in four physical parcels 410 form the stripe 202.

When data and parity are mixed in the physical parcel 410 at a predetermined ratio, conversion into the distributed RAID configuration in units of physical parcels 410 levels the ratio of data and parity in each storage drive 170. It is possible to prevent uneven loads on the storage drives 170 due to the concentration of parities on a specific drive as in RAID4.

The storage controller 100 updates data in the storage drive 170 in units of stripe blocks 201. For example, when the stripe block 201="D2-1" in the drawing is updated, "D2-1" and the parity block "P2" in the stripe including "D2-1" are updated.

Figure 7:
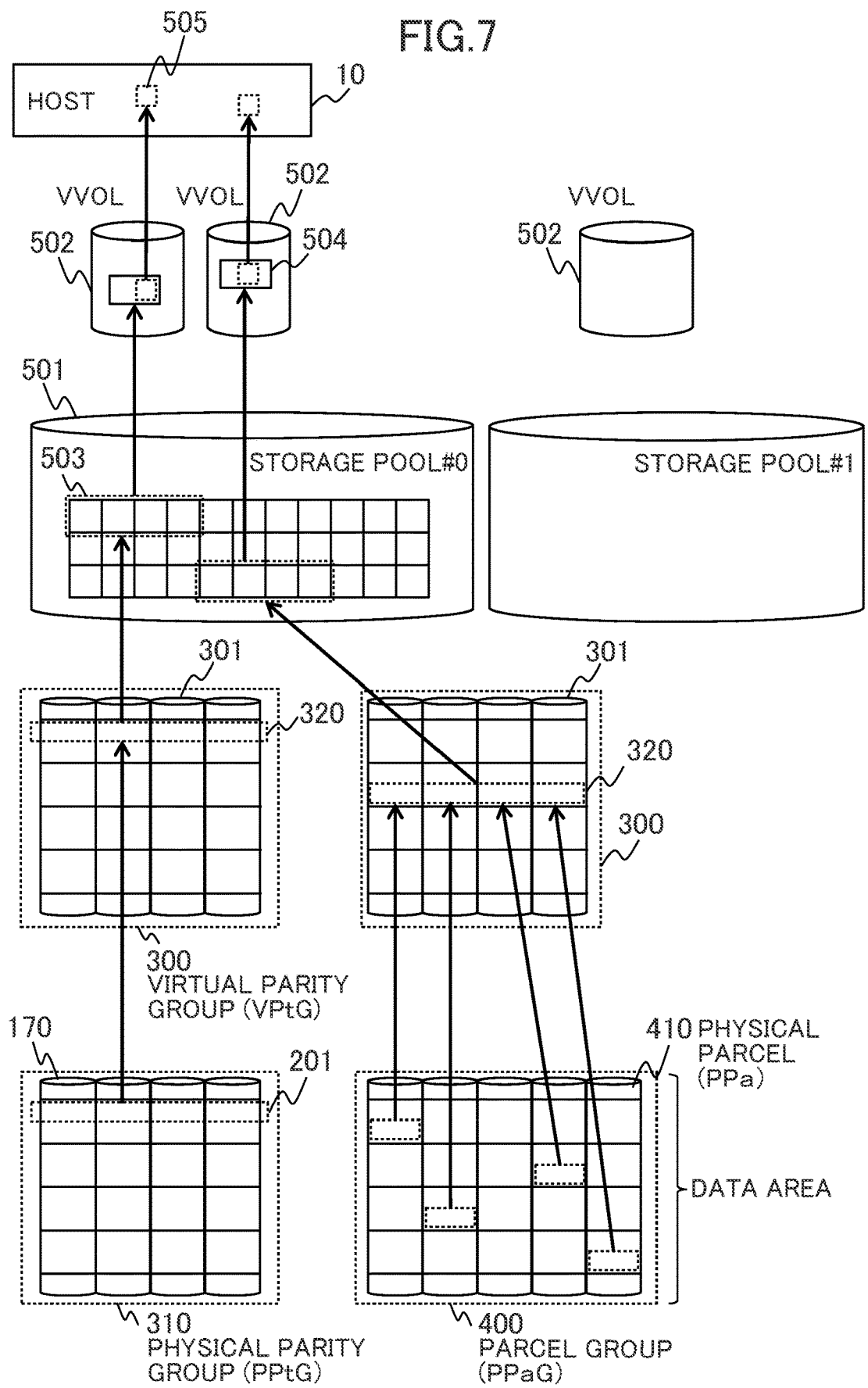
FIG. 7 is a diagram illustrating a logical hierarchy between a host and the parcel group according to the first embodiment of the present invention.

FIG. 7 is a diagram illustrating a logical hierarchy between the host 10 and the parcel group 400.

Multiple physical parcels 410 configure the parcel group 400. A data area (a non-spare area) in the parcel group 400 is allocated to the virtual parity group 300, thereby allocating the same virtual parity group 300 before and after the conversion to a storage pool 501 that provides the host 10 with storage areas.

The storage pool 501 includes a pool page 503 composed of one or more blocks. The storage pool 501 provides the host 10 with a virtual volume (VVOL) 502 as a storage area.

The virtual volume 502 is generated based on instructions from the management server 20 and is provided to the host 10. The size of virtual volume 502 is independent of the total available capacity of the actual storage drive 170. Based on an I/O request from the host 10, the storage controller 100 dynamically allocates the pool page 503 to the storage area (virtual volume page 504) in the virtual volume 502.

A virtual parcel 420 manages the virtual parity group 300. The virtual parcel 420 provides the host 10 with the parcel group 400 after conversion from a RAID group to a distributed RAID group as a storage area similar to the physical parity group 310. The host 10 can thereby access the parcel group 400 similarly to the virtual parity group 300 in the conventional RAID configuration via the virtual parity group 300 even after conversion to the distributed RAID configuration.

The parcel group 400 can be given the performance and characteristics according to the type (such as SSD or HDD) of the storage drive 170 to which the physical parcel 410 belongs. However, it is desirable to configure the storage pool 501 to be given the single performance characteristic for each pool page 503. Alternatively, the storage pool 501 may be divided into multiple partitions (or tiers) to configure the pool page 503 to be composed of data blocks existing in a single tier.

Tables

The description below explains the tables maintained in the control information storage area 123 of the storage controller 100.

FIG. 8 illustrates the group management table 1001. The group management table 1001 defines the relationship among the physical parity groups 310 and 400 and the virtual parity group 300.

One record of the group management table 1001 contains PPG #2001 to store identifiers of the physical parity groups 310 and 400, VPG #2002 to store an identifier of the virtual parity group 300, protection type 2003 (Protection Type in the drawing) to store a redundant configuration, data placement (Data Placement in the drawing) 2004 to store a data placement state, status (Status in the drawing) 2005 to store states of the physical parity groups 310 and 400, data area reallocation pointer 2006, and spare area reallocation pointer 2007.

The protection type 2003 stores the number of data drives "D" and the number of parity drives "P" as a redundant configuration. The data placement 2004 is set to "Traditional" for traditional RAID, set to "Distributed" for distributed RAID, and set to "Traditional→Distributed" for conversion in process.

The status 2005 stores states of the physical parity groups 310 and 400, namely, "Normal" for normal state or "Warning" for error occurrence.

The data area reallocation pointer 2006 and the spare area reallocation pointer 2007 store the positions (such as LBA) to save the data area and the spare area when the storage drive 170 fails, for example, during conversion from RAID to distributed RAID.

The data placement 2004 is also applicable to the conversion from "Distributed" to "Traditional." In this case, the conversion process to be described may be performed in the reverse order. When the data placement 2004 does not represent the conversion in process, the data area reallocation pointer 2006 and the spare area reallocation pointer 2007 store invalid values.

When the data placement 2004 represents the conversion in process, PPG #2001 stores the identifiers of the physical parity groups 310 and 400, and VPG #2002 stores the identifier of the virtual parity group 300. When the conversion to the distributed RAID configuration is completed, the data placement 2004 is updated to "Distributed." PPG #2001 stores the identifier of the parcel group 400 and VPG #2002 stores the identifier of the virtual parity group 300.

A well-known RAID technology can be applied to the management of the stripe block 201 or parity in the physical parity group (parcel group) 400 and the virtual parity group 300, for example, and illustrations or descriptions are omitted below.

FIG. 9 is a diagram illustrating the physical device (PDEV) management table 1002. The physical device management table 1002 represents the relationship between the physical device (storage drive 170) and the physical parity group 310 or 400 and represents the configuration and state of the physical device.

One record of the physical device management table 1002 contains PPG #2011 to store identifiers of the physical parity groups 310 and 400, PDEV #2012 to store physical device identifiers (or numbers), type 2013 to store the type of the physical device, size 2014 to store the capacity of the physical devices, and status 2015 to store the state of the physical devices.

The size 2014 of the physical device represents an example of displaying the number of blocks (512 bytes). The status 2015 stores "Normal" for normal state and "Blocked" for error occurrence.

FIG. 10 is a diagram illustrating the virtual device (VDEV) management table 1003. The virtual device management table 1003 represents the relationship between the virtual parity group 300 and the virtual device 301.

One record of the virtual device management table 1003 contains VPG #2021 to store the identifier of the virtual parity group 300 or the identifier of the virtual parcel group 430, VDEV #2022 to store the identifier of the virtual device, and size 2023 to store the capacity of the virtual device. The size 2023 of the virtual device represents an example of displaying the number of blocks (512 bytes).

Figure 11:
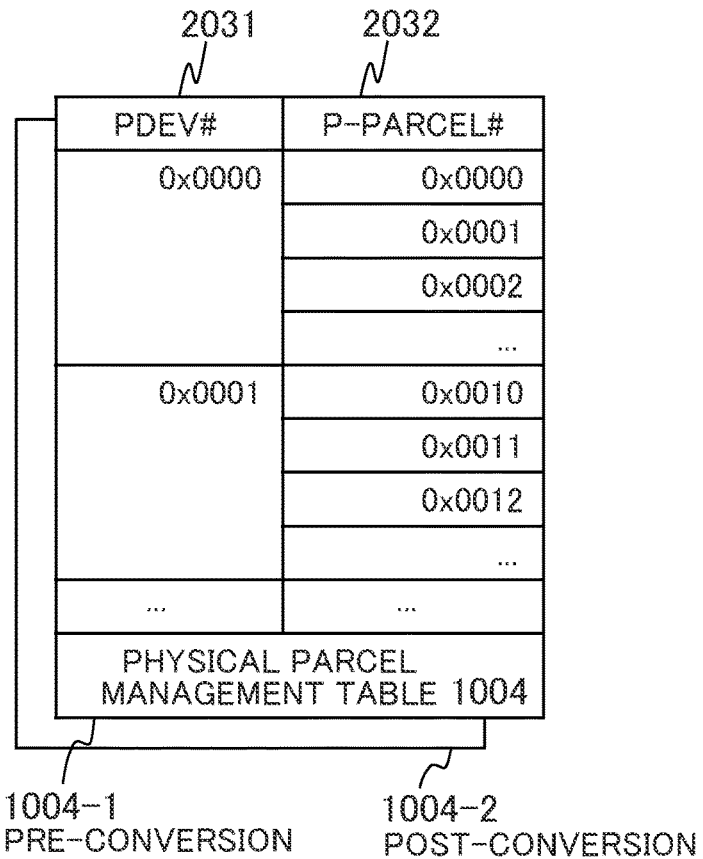
FIG. 11 is a diagram illustrating a physical parcel management table according to the first embodiment of the present invention.

FIG. 11 is a diagram illustrating the physical parcel management table 1004. The physical parcel management table 1004 manages the physical parcel 410 stored in the physical device (storage drive 170). When there occurs conversion between the traditional RAID configuration and the distributed RAID configuration, the physical parcel management table 1004 is generated as two tables, namely, the table before conversion (1004-1) and the table after conversion (1004-2).

One record of the physical parcel management table 1004 contains PDEV #2031 to store the identifier of the physical device and P-Parcel #2032 to store the identifier of the physical parcel 410 in the physical device.

As illustrated in FIG. 5, the physical parcel management table 1004 manages the physical parcel 410 of the data area and the physical parcel 410 of the spare area to be stored in each physical device (storage drive 170).

The size of the physical parcel 410 is a fixed value predetermined in the computer system. Therefore, it is possible to uniquely determine the position (LBA: Logical Block Address) of each physical parcel 410 in the storage drive 170 based on an offset of the physical parcel 410 in the storage drive 170, namely, at which physical chunk or storage area the physical parcel 410 is positioned in the storage drive 170 from the beginning.

Figure 12:
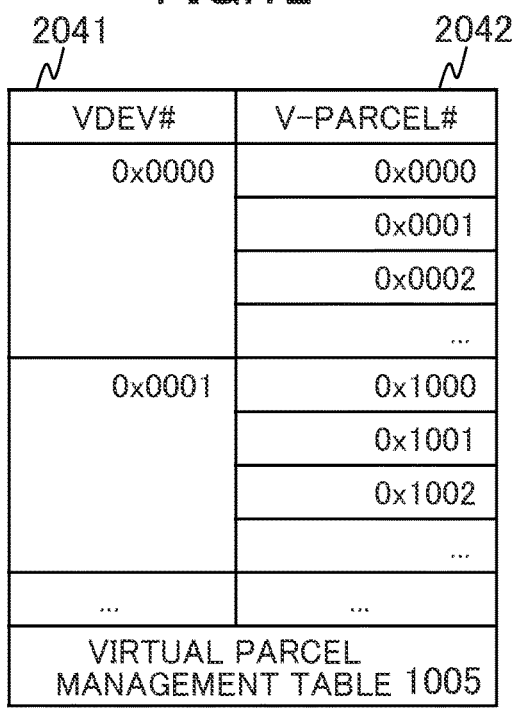
FIG. 12 is a diagram illustrating a virtual parcel management table according to the first embodiment of the present invention.

FIG. 12 is a diagram illustrating the virtual parcel management table 1005. The virtual parcel management table 1005 manages the virtual parcel 420 stored in the virtual device 301.

One record of the virtual parcel management table 1005 contains VDEV #2041 to store the identifier of the virtual device 301 and V-Parcel #2042 to store the identifier of the virtual parcel 420.

As illustrated in FIG. 5, the virtual parcel management table 1005 manages the virtual parcel 420 stored in each virtual device 301.

FIG. 13 is a diagram illustrating the parcel group management table 1006. The parcel group management table 1006 manages the relationship between the physical parcel 410 and the virtual parcel 420.

One record of the parcel group management table 1006 contains ParcelGroup #2051 to store the identifier of the parcel group 400, P-Parcel #2052 to store the identifier of the physical parcel 410, V-Parcel #2053 to store the identifier of the virtual parcel 420, allocated storage pool (Allocated Storage Pool in the drawing) #2054 to store the identifier of the allocated storage pool 501, and status 2055 to store the state of the parcel group 400.

The allocation storage pool #2054 manages to which storage pool 501 the virtual parcel 420 is allocated. The parcel group 400 may allow all virtual parcels 420 corresponding to the physical parcel 410 to be allocated to the storage pool 501 or may allocate only part of the virtual parcels 420 and add them to the storage pool 501 as needed.

It is desirable to allocate all virtual parcels 420 corresponding to the physical parcels 410 in the single parcel group 400 to the same storage pool 501 so that loads on the storage pool 501 do not affect the other storage pools 501.

The number of physical parcels 410 and virtual parcels 420 configuring the parcel group 400 varies with redundancy configurations (protection levels).

FIG. 14 is a diagram illustrating the spare conversion table 1007. The spare conversion table 1007 represents the mapping between data of a rebuild source and data of a rebuild destination when the storage drive 170 fails and the rebuild is performed.

One record of the spare conversion table 1007 contains PDEV #2061 to store the identifier of the physical device (storage drive 170) as a rebuild source, P-Parcel #2062 to store the identifier of the physical parcel 410 as a rebuild source, PDEV #2063 to store the identifier of the physical device (storage drive 170) as a rebuild destination, and P-Parcel #20643 to store the identifier of the physical parcel 410 as a rebuild destination.

When an I/O request is received from the host 10, the access destination may correspond to the failed storage drive 170. Then, the storage controller 100 references the spare conversion table 1007 and converts the physical parcel 410 as the access destination to P-Parcel #2064 as a save destination. This makes it possible to acquire an appropriate save destination address.

A copy-back (described later) is performed after the failed storage drive 170 is replaced. In this case, the storage controller 100 references the rebuild destination in the spare conversion table 1007 and converts it to P-Parcel #2062 as the save source. This makes it possible to acquire an appropriate save source address.

FIG. 15 is a diagram illustrating the storage pool management table 1008. The storage pool management table 1008 manages the virtual parity group 300 allocated to the storage pool 501 and the storage pool 501.

One record of the storage pool management table 1008 contains storage pool (Storage Pool in the drawing) #2071 to store the identifier of storage pool 501, size (Size (Block) in the drawing) 2072 to store the capacity of the storage pool 501, usage (Usage in the drawing) 2073 of the storage pool 501, and allocated virtual group (Allocated Virtual Group in the drawing) 2074 to store the identifier of the virtual parity group 300 allocated to the storage pool 501.

When the usage 2073 of the storage pool 501 exceeds a predetermined value, the storage controller 100 can increase the free space by newly allocating the unallocated (Not Allocated) virtual parity group 300 to the storage pool 501. It may be desirable to allocate virtual groups of all capacities from the beginning when configuring the storage pool 501.

The storage pool 501 is favorably composed of the single protection level and the storage drive 170. If the storage pool 501 can be divided into tiers and managed, the tiers may be mixed.

FIG. 16 is a diagram illustrating the virtual volume management table 1009. The virtual volume management table 1009 represents the virtual volume page 504 allocated to the virtual volume 502 and the relationship between the virtual volume page 504 and the pool page 503.

One record of the virtual volume management table 1009 contains VVOL #2081 to store the identifier of the virtual volume 502, size (Size (Block) in the drawing) 2082 to store the capacity of the virtual volume 502, VVOL Page #2083 to store the identifier of the virtual volume page 504, and pool Page #2084 to store the identifier of the pool page 503 to which the virtual volume page 504 is allocated.

The capacity of pool page 503 and the capacity of virtual volume page 504 are fixed values predetermined in the computer system. Upon receiving a write request, the storage controller 100 writes data to the pool page 503 of Pool Page #2084 allocated to the virtual volume page 504 corresponding to the requested position (LBA).

Initially, the virtual volume management table 1009 allows Pool Page #2084 to contain "Not Allocated" because the pool page 503 is not allocated to the virtual volume page 504. When the pool page 503 runs out of free space, the storage controller 100 allocates a new Pool Page #2084 to the virtual volume page 504.

FIG. 17 is a diagram illustrating the pool page management table 1010. The pool page management table 1010 manages the configuration of the pool page 503.

One record of the pool page management table 1010 contains pool ID 2091 to store the identifier of the storage pool 501, pool Page #2092 to store the identifier of the pool page 503, start LBA2093 to store the start position (address) of the pool page 503 in the storage pool 501, V-Parcel #2094 to store the identifier of the virtual parcel 420 allocated to the pool page 503, and start LBA2095 to store the start position (address) in the virtual parcel 420.

The storage controller 100 references the pool page management table 1010 and thereby identifies to which area in the storage pool 501 the pool page 503 corresponds. This makes it possible to identify to which area in the virtual parcel 420 that area corresponds.

When the storage area allocated to the pool page 503 is a traditional RAID configuration, V-Parcel #2094 stores the identifier of virtual stripe block 320. The start LBA2095 stores the start position in the virtual stripe block 320.

Write Process

The description below explains a process when the storage controller 100 receives a write request from the host 10. The following provides an example after converting a conventional RAID configuration to a distributed RAID configuration.

The host 10 specifies the identifier of the virtual volume 502 (VVOL #2081) and the address in the virtual volume 502 (LBA) and transmits a data write request to the storage controller 100.

The storage controller 100 references the virtual volume management table 1009 and, from VVOL Page #2083, specifies the identifier of the virtual volume page 504 to be written based on VVOL #2081 and the address.

From the virtual volume management table 1009, the storage controller 100 then acquires the identifier (2084) of the pool page 503 corresponding to the identifier of the specified virtual volume page 504.

The storage controller 100 references the pool page management table 1010, acquires the identifier (V-Parcel #2094) and start LBA2095 of the virtual parcel 420 corresponding to the pool page 503 (Pool Page #2092), and specifies the starting position of the virtual parcel 420.

The storage controller 100 then references the parcel group management table 1006, acquires the identifier of the physical parcel 410 from P-Parcel #2052 based on the identifier of the virtual parcel 420, and acquires the identifier of the parcel group 400 from Parcel Group #2051.

The storage controller 100 references the post-conversion physical parcel management table 1004-2 and acquires the identifier of a physical device corresponding to the identifier of the parcel group 400 from PDEV #2031.

The storage controller 100 references the physical device management table 1002, specifies the parcel group 400 from PPtG #2011, and writes data in the physical parcel 410. Namely, data is transmitted to the drive enclosure 160. The drive enclosure 160 stores the received data in the storage drive 170 corresponding to the physical parcel 410. Before being transmitted to the drive enclosure 160, data may be temporarily stored in the cache memory package 130.

According to the above-described process, the storage controller 100 successively specifies the virtual parcel 420, the physical parcel 410, and the physical device (storage drive 170) based on the identifier and address of the virtual volume 502, making it possible to perform the write requested by the host 10.

Overview of the Conversion From RAID to Distributed RAID

Figure 18A:
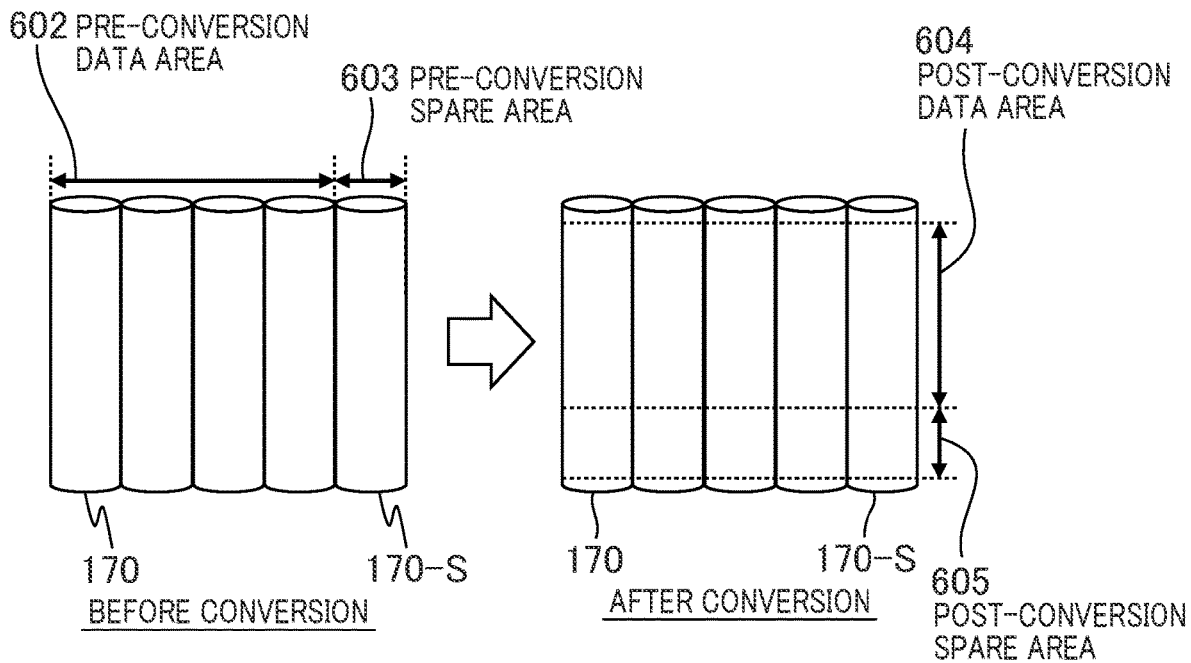
FIG. 18A is a diagram illustrating the relationship between a data area and a spare area before and after conversion according to the first embodiment of the present invention.
Figure 18B:
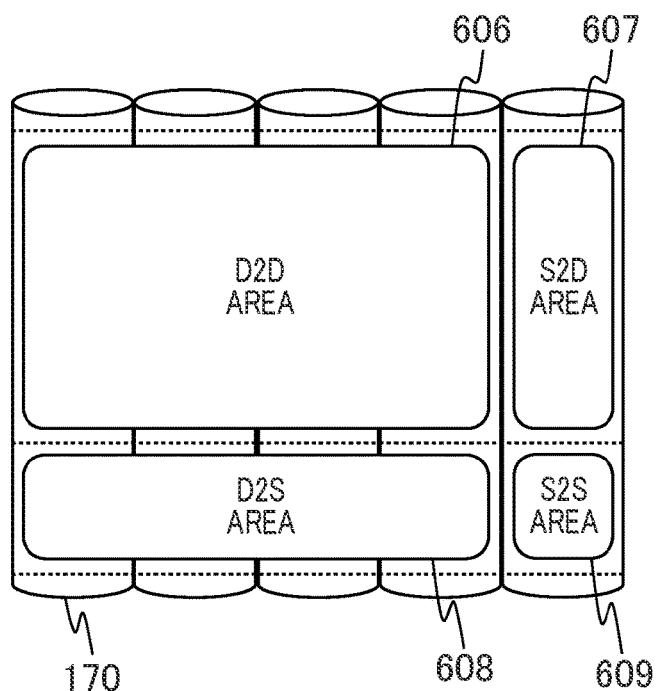
FIG. 18B is a diagram illustrating the relationship between the data area and the spare area after conversion according to the first embodiment of the present invention.

FIGS. 18A and 18B are diagrams illustrating an overview of the storage area for conversion from a conventional RAID configuration (Traditional Parity Group) to a distributed RAID configuration (Distributed Parity Group).

FIG. 18A is a diagram illustrating the relationship between the data area and the spare area before and after the conversion. The pre-conversion RAID configuration is 3D1P RAID5 and configures a pre-conversion data area 602 using four storage drives 170 to provide the host 10 with a storage area.

A spare area needs to be added before conversion to the distributed RAID. Therefore, one or more spare drives 170-S are added to the RAID configuration to provide a pre-conversion spare area 603. When the conversion to the distributed RAID is completed, storage areas for four storage drives 170 and one spare drive 170-S are converted to a post-conversion data area 604 and a post-conversion spare area 605 based on a similar ratio.

Namely, the storage controller 100 provides the pre-conversion data area 602 by using the multiple storage drives 170 in the RAID configuration before conversion and the pre-conversion spare area 603 by using the storage area of the spare drive 170-S. Then, the protection system conversion program 1101 divides an area resulting from concatenating the pre-conversion data area 602 and the pre-conversion spare area 603 into the post-conversion data area 604 and the post-conversion spare area 605 based on a predetermined ratio or capacity and evenly applies them to the storage drive 170 and the spare drive 170-S.

FIG. 18B is a diagram illustrating the relationship between the data area and the spare area after the conversion. The storage drive 170 in the RAID configuration contains the pre-conversion data area 602 that changes to the post-conversion spare area 605 after conversion to the distributed RAID configuration. This area is referred to as a D2S area (608). The RAID configuration contains the pre-conversion spare area 603 that changes to the post-conversion data area 604 after conversion to the distributed RAID configuration. This area is referred to as an S2D area (607).

The RAID configuration contains the pre-conversion data area 602 that changes to the post-conversion data area 604 after conversion to the distributed RAID configuration. This area is referred to as a D2D area (606). Moreover, the RAID configuration contains the pre-conversion spare area 603 that changes to the post-conversion spare area 605. This area is referred to as an S2S area (609).

In other words, the storage controller 100 identifies the D2D area (first area) as an overlap between the pre-conversion data area 602 and the post-conversion data area 604, the S2D area (second area) as an overlap between the pre-conversion spare area 603 and the post-conversion data area 604, the D2S area (third area) as an overlap between the pre-conversion data area 602 and the post-conversion spare area 605, and the S2S area (fourth area) as an overlap between the pre-conversion spare area 603 and the post-conversion spare area 605.

The pre-conversion spare area 603 is typically the spare drive 170-S provided in the system but may be the new storage drive 170 added separately for conversion. The rebuild in the distributed RAID configuration requires the number of drives in the parcel group 400 after conversion to be at least the RAID width plus one or more. For example, 3D1P requires five or more storage drives 170.

FIG. 18B provides the example of generating the post-conversion spare area 605 in the latter half (lower part in the drawing) of the storage drive 170. However, the present invention is not limited thereto. The post-conversion spare area 605 can be generated at any position as long as the post-conversion spare area 605 and the post-conversion data area 604 are maintained to a specified size in each storage drive 170. For example, the post-conversion spare area 605 may be positioned at the beginning of the storage drive 170 or may be distributed in the storage drive 170 based on a specified rule.

The additional spare drive 170-S (pre-conversion spare area 603) may be specified by a user or automatically selected by the computer system 1. The conventional physical parity group 310 may be composed of the storage drives 170 in the different drive enclosure 160 to resist errors of the drive enclosure 160. In such a case, the additional storage drive 170 may also be selected from the different drive enclosure 160.

FIG. 19 is a diagram illustrating a process of converting a conventional RAID into a distributed RAID. Similarly to FIG. 18A, the example adds one spare drive 170-S (#S in the drawing) to the 3D1P RAID configuration to add the pre-conversion spare area 603. The protection system conversion program 1101 of the storage controller 100 changes the configuration to the distributed RAID.

In the initial state "1." one spare drive 170-S is added to the four data drives. Then, the capacity or ratio of the post-conversion data area 604 and the post-conversion spare area 605 is defined. The size of the post-conversion spare area 605 is determined based on the data protection level. The storage controller 100 configures the physical parcel 410, the parcel group 400, the virtual parcel 420, and the virtual parcel group 430.

As the first movement "2," the storage controller 100 selects one of the multiple physical parcels 410 and moves it to the S2D area. In this case, the multiple physical parcels 410 belong to the D2D area illustrated in FIG. 18B and allow the corresponding stripe block 201 to form a stripe 401. The storage controller 100 then changes the D2D area as the movement source to an unallocated physical parcel 410 (free area).

In the illustrated example, the physical parcels 410 such as "0-0," "1-1," "2-2" through "20-3" are moved to the S2D area. The physical parcels 410 as the movement source are set to be unallocated. The physical parcel 410, if unallocated, does not need to be actually moved to the S2D area.

A procedure to move the physical parcel 410 in the D2D area to the S2D area selects one physical parcel 410 from each of the data drives (#0 through #4 in the drawing) containing the parcel groups 400 and successively writes the physical parcels 410 to the spare drive (#S in the drawing).

According to the illustrated example, the storage controller 100 references the physical parcel management table 1004 and moves the physical parcel "0-0" at the first column of data drive #0 to the physical parcel at the first column of spare drive #S.

The storage controller 100 then moves physical parcel "1-1" at the second column of data drive #1 to the physical parcel at the second column of spare drive #S. The storage controller 100 then moves physical parcel "2-2" at the third column of data drive #2 to the physical parcel at the third column of spare drive #S.

The storage controller 100 selects the data drives #0 through #3 in a round-robin fashion and selects the physical parcel 410 to be moved while incrementing the columns of the physical parcel management table 1004. Namely, the selection is made to even the number of physical parcels 410 moved from the storage drives 170. The storage controller 100 then sequentially stores the physical parcels 410 to be moved from the beginning of the storage area of spare drive #S and repeats the above-described process until reaching the end of the post-conversion data area 604 illustrated in FIG. 18A. Data in the physical parcel 410 moves between the storage drives.

The second movement "3." moves the physical parcel 410 of the parcel group 400 in the D2S area illustrated in FIG. 18B to the unallocated D2D area and changes the D2D area as the movement source to an unallocated physical parcel 410 (spare area).

According to the illustrated example, the physical parcels 410 such as "101-0," "101-1," "101-2," and "101-3" move from the D2S area to the D2D area. This movement occurs in the storage drive 170 and causes no data to move on the storage media, only requiring a change in the mapping between the virtual parcel and the physical parcel on the storage media.

The first movement and the second movement may be each repeated a predetermined number of times. The storage controller 100 repeats the above-described process until completely moving all the physical parcels 410 in the D2S area.

Finally, at "4." the storage controller 100 causes the physical parcels 410 in the D2S area to be unallocated and terminates the process.

There is no limitation on the placement of the parcel group 400 of the distributed RAID after conversion under the condition that some physical parcels 410 belonging to the same parcel group 400 cannot be placed on the same storage drive 170.

The present embodiment minimizes the amount of movement for the reallocation from the placement before conversion to the placement after conversion. However, for example, the placement may be changed to average loads on the storage drives 170 at the time of rebuilding. In this case, depending on the placement of the areas after conversion, the movement from the D2D area to the S2D area may be followed by successive movement from the other D2D areas to free areas like a chain reaction.

Though an explanation is omitted in the present embodiment, there may be a physical parcel that moves from the D2S area to the S2D area via the S2S area.

There has been described the example where the storage controller 100 selects the data drives #0 through #3 in a round-robin fashion, sequentially increments the columns from the first column of the data area corresponding to the data drives while performing writing to the column for spare drive #S corresponding to the same column, and repeats the process up to the end of the post-conversion data area 604. However, the present invention is not limited thereto.

The physical parcels 410 to be moved can be almost evenly moved from the data drives #0 through #3 to spare drive #S, making it possible to use a favorite selection method for each computer system 1.

Details of the Process

Figure 20:
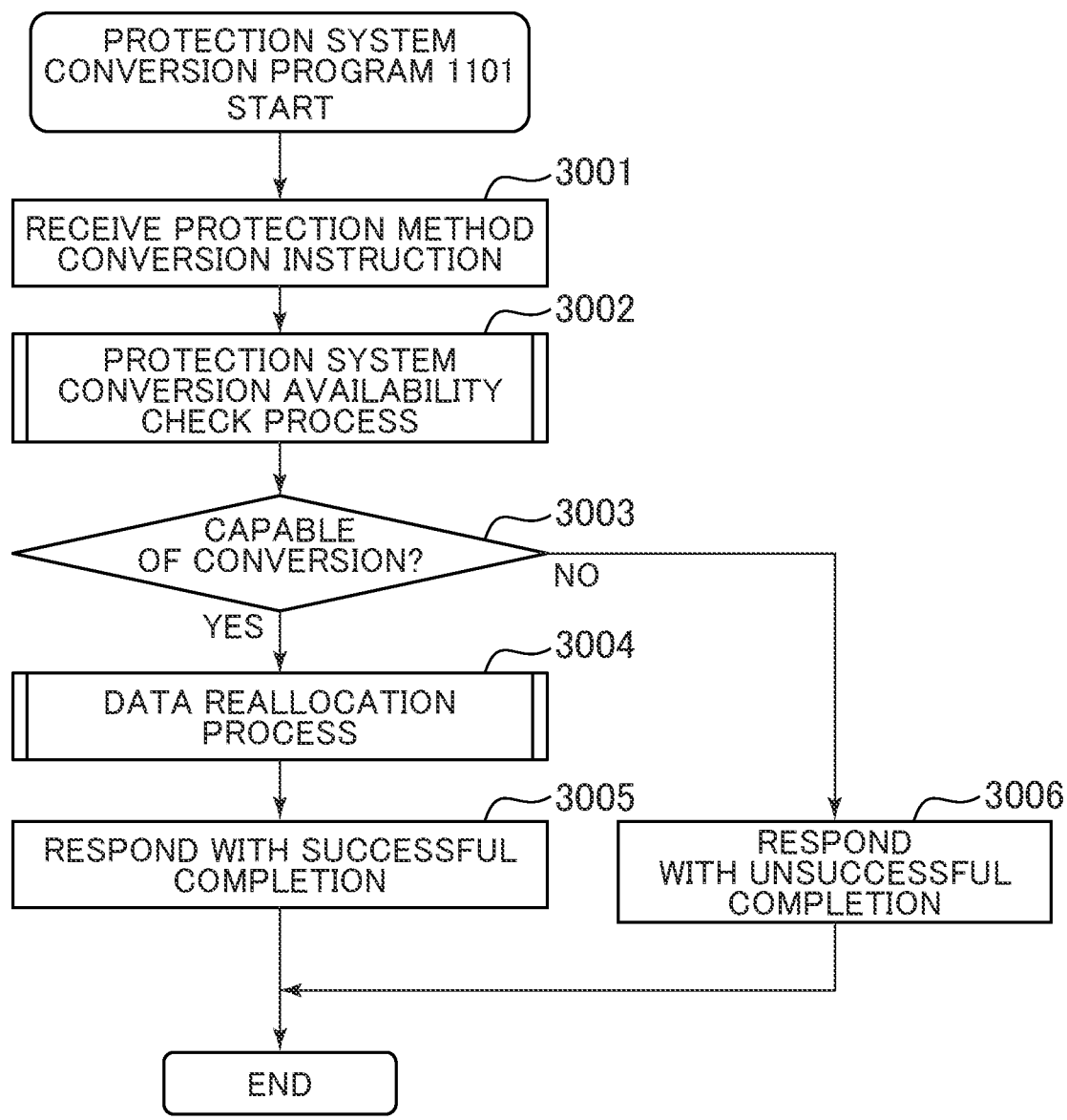
FIG. 20 is a flowchart illustrating a protection system conversion process according to the first embodiment of the present invention.

FIG. 20 is a flowchart illustrating the conversion process from the conventional RAID to the distributed RAID. In this process, the storage controller 100 executes the protection system conversion program 1101 upon receiving a command from the management server 20, for example. It is assumed that a predetermined number of spare drives #S are added or allocated to the physical parity group 310 to be converted.

The description below assumes the storage controller 100 or the protection system conversion program 1101 to be the subject of the process. However, the present invention is not limited thereto. The CPU 120 or the core 121 may be the subject of the process.

The storage controller 100 accepts a protection method conversion instruction (3001). The present embodiment illustrates an example of accepting an instruction to convert a specified physical parity group 310 from the RAID configuration to the distributed RAID configuration. The storage controller 100 starts the protection system conversion program 1101.

The protection system conversion program 1101 then checks whether the specified physical parity group 310 can convert from the RAID configuration to the distributed RAID configuration, as described below (3002). The protection system conversion program 1101 determines whether the conversion is possible (3003), and proceeds to step 3004 if the conversion is possible, or proceeds to step 3006 if the conversion is impossible.

At step 3004, as illustrated in FIGS. 6 and 19, the protection system conversion program 1101 converts the physical parity group 310 to the parcel group 400, defines each area to be converted as illustrated in FIG. 18B, and then performs conversion in units of physical parcel 410 to reallocate the data. The details of the conversion process will be described later.

At step 3005, the protection system conversion program 1101 responds to the management server 20 by notifying completion of the conversion and terminates the process. The conversion may be impossible according to the determination at step 3003. Then, at step 3006, the protection system conversion program 1101 responds to the management server 20 by notifying that the conversion is impossible and then terminates the process.

When the process of conversion into the distributed RAID configuration is completed at step 3005, the protection system conversion program 1101 updates the parity group identifiers in the group management table 1001 and the storage pool management table 1008 to parcel group identifiers.

The protection system conversion program 1101 generates the post-conversion physical parcel management table 1004-2, stores the identifier of the physical parcel 410 after conversion in P-Parcel #2032, stores the identifier of the physical device in PDEV #2031, and terminates the process.

Figure 21:
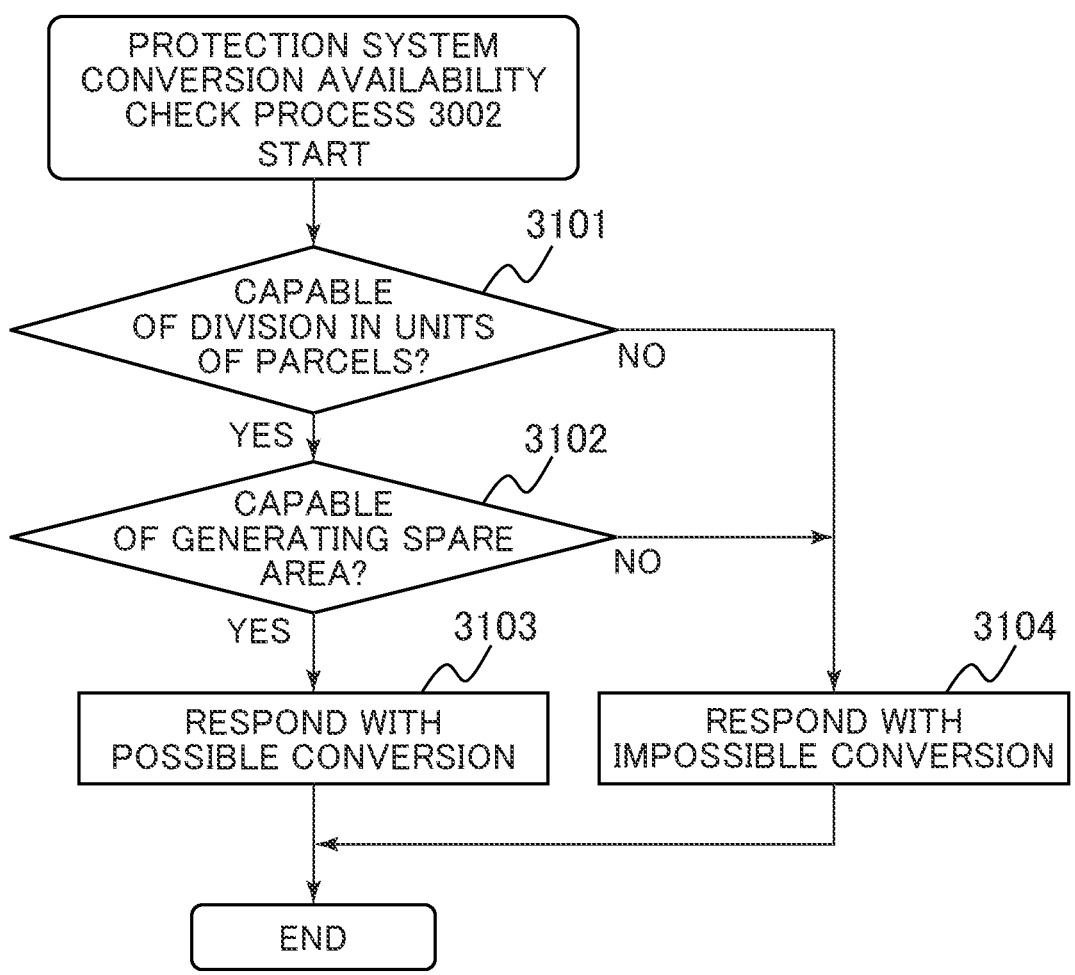
FIG. 21 is a flowchart illustrating a protection system conversion availability check process according to the first embodiment of the present invention.

FIG. 21 is a flowchart illustrating a protection system conversion availability check process. This process is performed at step 3002 in FIG. 21.

At step 3101, the protection system conversion program 1101 determines whether the physical parity group 310 to be converted can be divided in units of the physical parcels 410.

The process of dividing into the physical parcels 410 may generate a fractional area (unmanaged area) of less than xGB at the maximum when the capacity of xGB is applied to the physical parcel 410 as a management unit for the parcel group 400. That area is unavailable as a physical parcel.

For example, suppose the capacity of storage drive 170 is divided by xGB to yield the remainder of yGB. Then, the conversion is impossible if a free area of yGB or more is unavailable (=in use) in the area at the end of each storage drive 170. In this case, it is necessary to ensure a free area at the end by migrating data to other physical parity groups 310, deleting data, or reallocating sub-blocks 200 in the same physical parity group 310.

If the division in units of the physical parcels 410 is impossible, the protection system conversion program 1101 proceeds to step 3104 to notify that the conversion is impossible.

At step 3102, the protection system conversion program 1101 determines whether the storage drive 170 and the spare drive 170-S can currently generate the post-conversion spare area 605.

It is necessary to equalize I/O processing loads or capacity efficiency among all storage drives 170 in the distributed RAID group. Therefore, it is desirable that the storage controller 100 evenly allocate the post-conversion spare area 605 to all storage drives 170 in the distributed parity group.

According to the present embodiment, the protection system conversion program 1101 divides the area of the physical parity group 310 into physical parcels 410 for management. Therefore, it is impossible to efficiently and evenly distribute the capacity of the corresponding to one storage drive 170 to all storage drives 170.

Therefore, the protection system conversion program 1101 needs to ensure the spare area capacity comparable to one storage drive 170 plus extra capacity in the existing storage area. Therefore, the conversion is impossible if the existing RAID configuration is short of free space plus extra capacity. In this case, as above, it is necessary to ensure a free area at the end by migrating data to other physical parity groups 310, deleting data, or reallocating sub-blocks 200 in the same physical parity group 310.

Therefore, if it is impossible to ensure the spare area, the protection system conversion program 1101 notifies that the conversion is impossible at step 3104. If the conversion is possible, the protection system conversion program 1101 notifies that the conversion is possible at step 3103. After the above-described process, control returns to the process illustrated in FIG. 20.

For example, suppose the storage drive 170 has the capacity of 1000 GB and the RAID configuration before conversion is 9D+1P (10 units). Then, after conversion, the post-conversion spare area 605 is defined as being 1000 GB per 10 units=100 GB on each storage drive 170.

Suppose the size of the physical parcel 410 is 51 GB. To ensure the minimum total spare capacity (1000 GB), two spare physical parcels 410 need to be defined for each storage drive 170 (51 GB×2×10 units=1020 GB>1000 GB). The spare capacity of each drive is 51 GB×2=102 GB. The conversion cannot be performed if 2 GB of free area is missing in each storage drive 170. In this case, the protection system conversion program 1101 notifies that the conversion is impossible.

Figure 22:
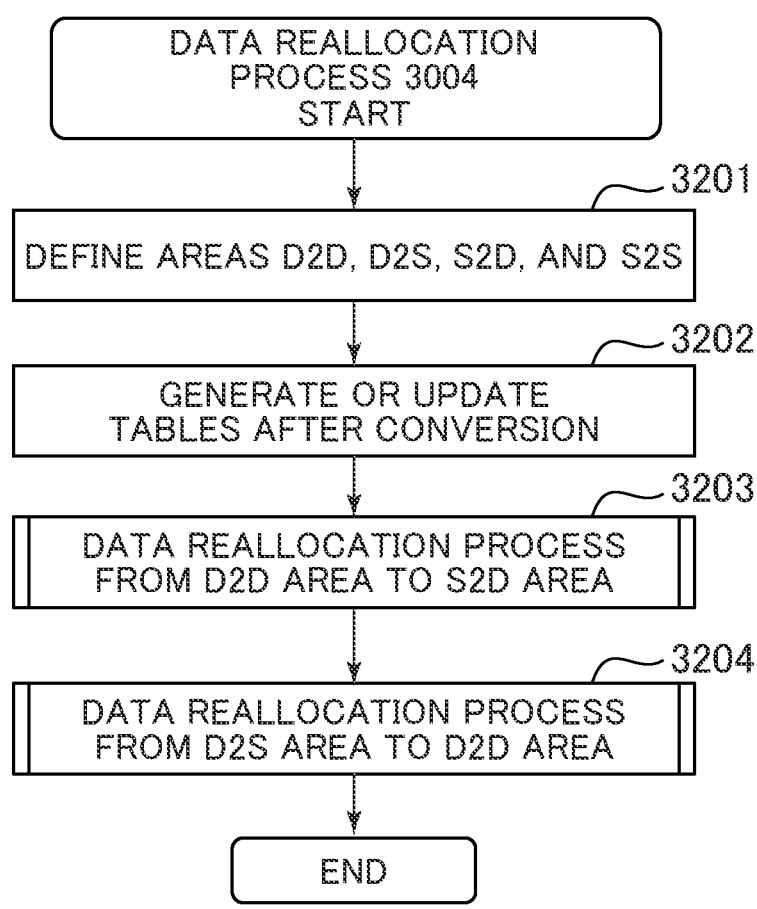
FIG. 22 is a flowchart illustrating a data reallocation process according to the first embodiment of the present invention.

FIG. 22 is a flowchart illustrating the data reallocation process performed at step 3004 of FIG. 20.

At step 3201, the protection system conversion program 1101 defines each storage area of distributed RAID. As illustrated in FIG. 18B, the storage area of distributed RAID includes the D2D area and the S2D area to store data and the D2S area and the S2S area as spare areas. The protection system conversion program 1101 defines the sizes (or ratios) of these storage areas.

The definition of each storage area uses the capacity or ratio of each storage area specified by an administrator who uses the management server 20. Alternatively, the protection system conversion program 1101 may accept the data capacity of the pre-conversion data area 602 and the capacity of the additional spare drive 170-S and determine the size of each storage area after conversion based on a predetermined ratio, for example.

At step 3202, the protection system conversion program 1101 generates or updates the various tables after conversion. The protection system conversion program 1101 updates already existing tables or generates a non-existent table.

The physical parcel management table 1004 and the virtual parcel management table 1005 before and after the conversion are generated (updated) when the conventional RAID is converted to the distributed RAID. The storage pool management table 1008 and virtual volume management table 1009 used for the conventional RAID configuration can be used unchanged.

As illustrated in FIG. 6, the protection system conversion program 1101 allocates the physical parcel 410 and the parcel group 400 to the parity configuration of the sub-block 200 and the stripe block 201 and sets the identifier of the physical parcel 410 to P-Parcel #2032 in the physical parcel management table 1004 corresponding to the storage drive 170 to be converted. The protection system conversion program 1101 maintains the physical parcel management table 1004 at the start of conversion as a pre-conversion physical parcel management table 1004-1.

At step 3203, the protection system conversion program 1101 sets the physical parcel 410 and then moves the physical parcel 410 in the D2D area to the S2D area. Upon completing the movement of the targeted physical parcel 410 to the S2D area, the protection system conversion program 1101 generates an unallocated (free) area in the D2D area as the movement source.

At step 3204, the protection system conversion program 1101 moves the physical parcel 410 in the D2S area to an unallocated (free) area of the D2D area on the same storage drive 170. Upon completing the movement of the physical parcel 410 from the D2S area to the D2D area, the protection system conversion program 1101 sets the D2S area to the unallocated area.

According to the example of the present embodiment, the protection system conversion program 1101 completes movement, the first movement, of the physical parcel 410 from the D2D area to the S2D area and then completes movement, the second movement, of all physical parcels 410 from the D2S area to the D2D area. However, the present invention is not limited thereto.

For example, suppose the data mapping may be repeated periodically. Then, the first and second movements may be performed in an area that forms a given unit. Alternatively, the first and second movements may be performed in another storage area. It is possible to reduce the size of the table used for the conversion by repeating the first and second movements in units of a predetermined number of parcel groups 400.

Figure 23:
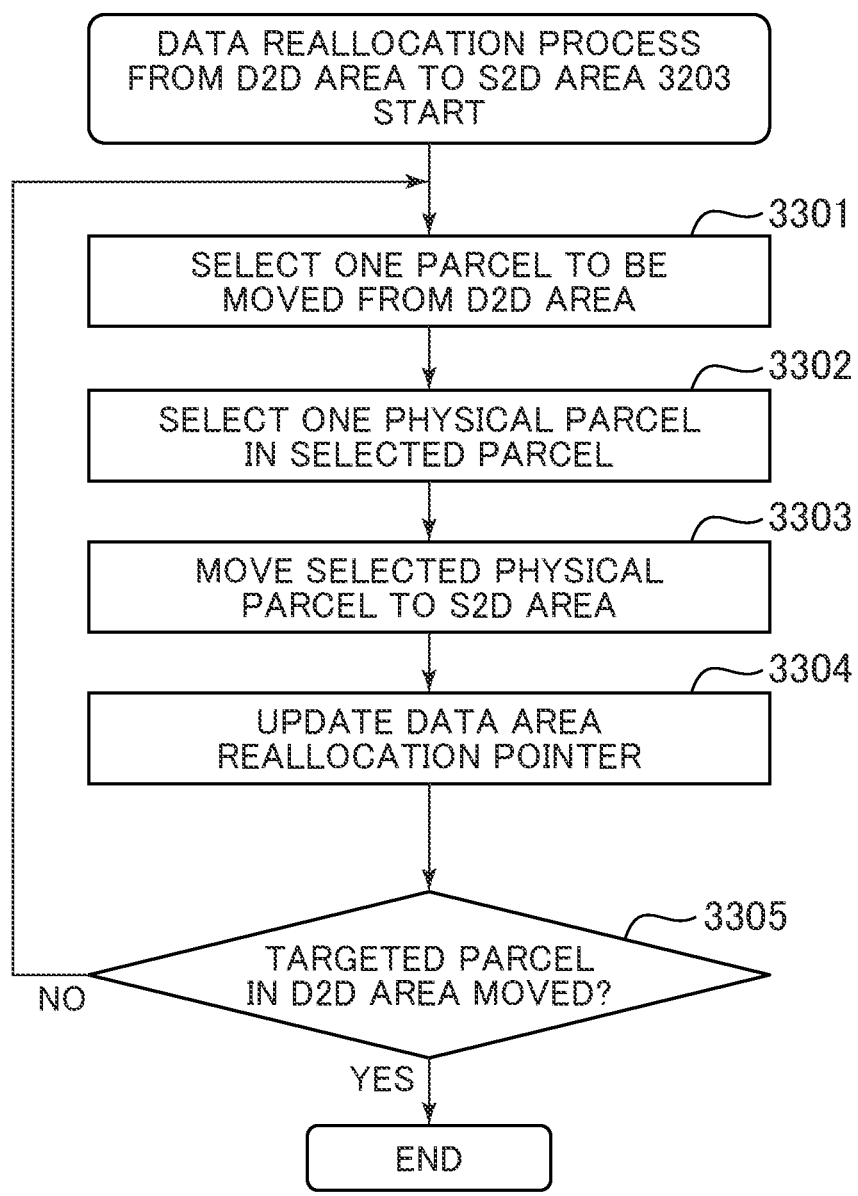
FIG. 23 is a flowchart illustrating a data reallocation process from a D2D area to an S2D area according to the first embodiment of the present invention.

FIG. 23 is a flowchart illustrating the data reallocation process from the D2D area to the S2D area performed at step 3203 of FIG. 22.

At step 3301, the protection system conversion program 1101 selects one physical parcel 410 to be moved from the D2D area 606. Regarding the order of selection, the protection system conversion program 1101 can sequentially select the physical parcels 410 from the beginning of the pre-conversion data area 602 as illustrated on "1. Initial state" in FIG. 19, for example.

At step 3302, the protection system conversion program 1101 selects one stripe block 201 as a moving target from within the selected physical parcel 410.

According to the example in FIG. 19, the physical parcel 410="0-0" is selected and includes the stripe blocks 201 such as "D1-1," and "D2-1" through "P8" as illustrated in FIG. 6.

At step 3303, the protection system conversion program 1101 writes the stripe block 201 of the physical parcel 410 selected in the D2D area to the S2D area for movement. This process is performed on all stripe blocks 201 in that physical parcel 410. The protection system conversion program 1101 changes the D2D area 606 as the movement source to the unallocated storage area.

At step 3304, the protection system conversion program 1101 updates the reallocation pointer in the group management table 1001. Namely, the protection system conversion program 1101 updates the position (such as the position from the beginning of the storage area for the storage drive 170) of the D2D area as the movement source for the physical parcel 410 by writing the position to the data area reallocation pointer 2006.

Upon completing the movement of the physical parcel 410, the protection system conversion program 1101 updates the post-conversion physical parcel management table 1004-2. To accomplish this update, the protection system conversion program 1101 stores the identifier of the physical parcel 410 moved from the D2D area to the S2D area in the physical parcel management table 1004 after the conversion so that the identifier corresponds to the spare drive identifier.

As the physical devices for the physical parcels 410 move, the protection system conversion program 1101 updates various management tables such as the parcel group management table 1006 and the virtual parity group management table 1011, for example.

At step 3305, the protection system conversion program 1101 determines whether the targeted physical parcel 410 is completely moved from the D2D area 606 to the S2D area 607. If the movement is complete, the protection system conversion program 1101 terminates the process. If the movement is incomplete, control returns to step 3301 to repeat the above-described process on the next physical parcel 410.

The movement from the D2D area to the S2D area is targeted at the physical parcel 410 stored in the post-conversion data area 604 corresponding to the pre-conversion data area 602 illustrated in FIG. 18A.

Based on the above-described process, the protection system conversion program 1101 completes the first movement by sequentially moving targeted physical parcels 410 one by one from the D2D area to the S2D area. Upon completion of the first movement, a free area is generated at the position where the physical parcel 410 as the movement source is stored, as illustrated in "2." of FIG. 19.

Figure 24:
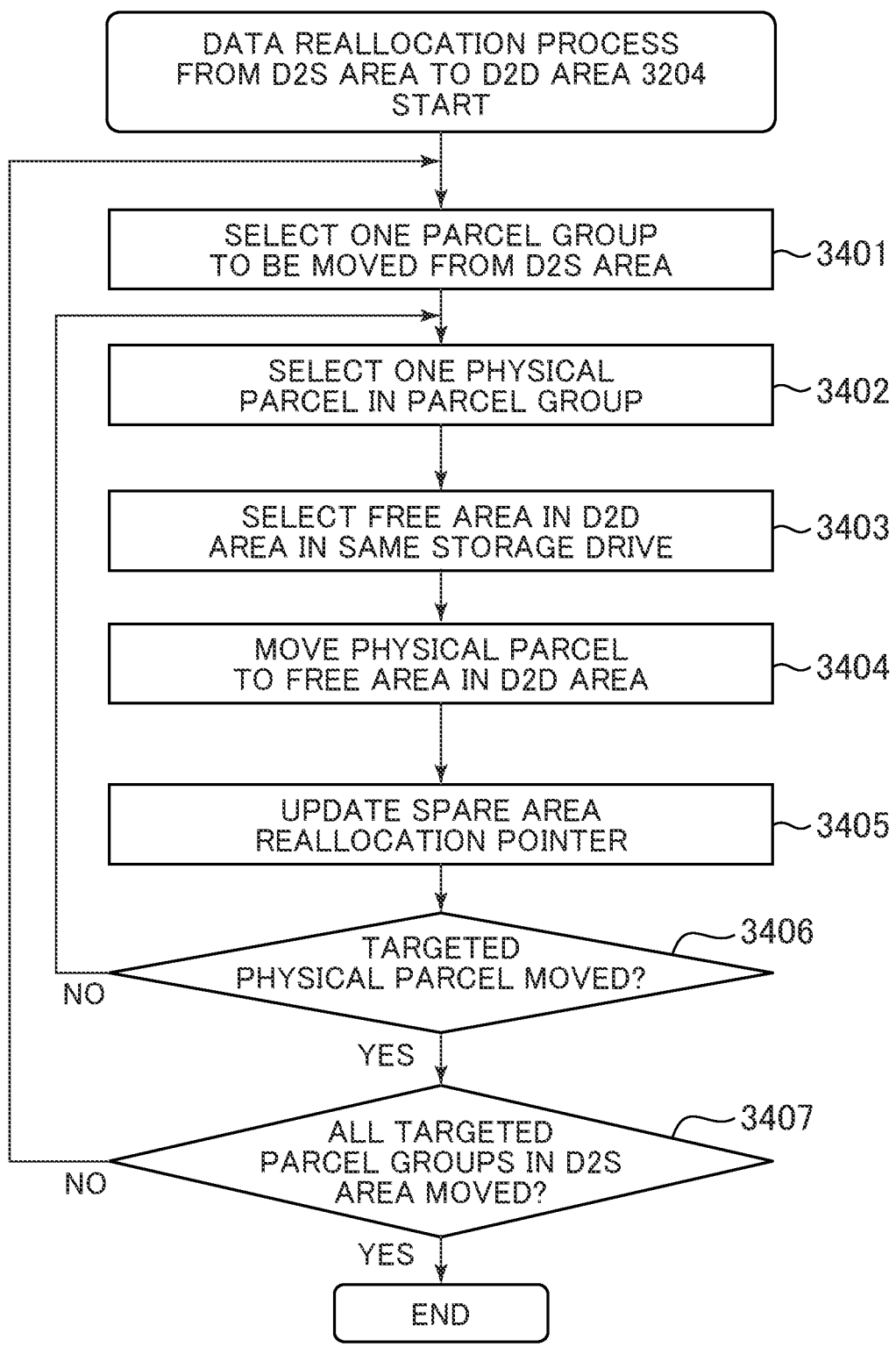
FIG. 24 is a flowchart illustrating a data reallocation process from a D2S area to a D2D area according to the first embodiment of the present invention.

FIG. 24 is a flowchart illustrating the data reallocation process from the D2S area to the D2D area performed at step 3204 of FIG. 22.

At step 3401, the protection system conversion program 1101 selects one physical parcel 410 to move from the D2S area. The protection system conversion program 1101 can select sequentially the physical parcels 410 from the position corresponding to the beginning of the post-conversion spare area 605 in the pre-conversion data area 602.

At step 3402, the protection system conversion program 1101 selects one of the selected physical parcels 410. The physical parcels 410 can be selected sequentially from the storage drives 170 such as #0 through #3 in FIG. 19.

At step 3403, the protection system conversion program 1101 selects an unallocated area (free area) in the D2D area on the same storage drive 170 as the selected physical parcel 410. The protection system conversion program 1101 selects the free area as the movement source for the physical parcel 410 moved to the D2S area, as illustrated on "2." in FIG. 19.

At step 3404, the protection system conversion program 1101 moves the physical parcel 410 selected in the D2S area to the unallocated area of the D2D area selected on the same storage drive 170. The protection system conversion program 1101 changes the D2S area as the movement source to the unallocated storage area.

At step 3405, the protection system conversion program 1101 updates the reallocation pointer in the group management table 1001. Namely, the protection system conversion program 1101 updates the position (such as the position from the beginning of the storage area of the storage drive 170) of the D2S area as the movement source for the physical parcel 410 by writing the position to the spare area reallocation pointer 2007.

As the physical parcels 410 move on the storage drive 170, the protection system conversion program 1101 updates various management tables such as the parcel group management table 1006 and the virtual parity group management table 1011.

At step 3406, the protection system conversion program 1101 determines whether all targeted physical parcels 410 to be moved in the same parcel group 400 are completely moved. If the physical parcels 410 in the parcel group 400 are completely moved, the protection system conversion program 1101 proceeds to step 3407. If the movement is incomplete, control returns to step 3402 to repeat the above-described process on the next physical parcel 410.

At step 3407, the protection system conversion program 1101 determines whether all targeted physical parcels 410 in the D2S area are completely moved from the D2S area to the D2D area. If the movement is complete, the protection system conversion program 1101 terminates the process. If the movement is incomplete, control returns to step 3401 to repeat the above-described process on the next parcel group 400.

The parcel group 400 to be moved is stored in the storage area (D2S area) from the beginning to the end of the post-conversion spare area 605 in the pre-conversion data area 602 illustrated in FIG. 18A.

Based on the above-described process, the storage controller 100 completes the second movement to move the physical parcel 410 in the D2S area to the free area in the D2D area on the same storage drive 170. As a result, as illustrated in FIG. 18A, the post-conversion spare area 605 is generated in the latter half of the pre-conversion data area 602.

Figure 25A:
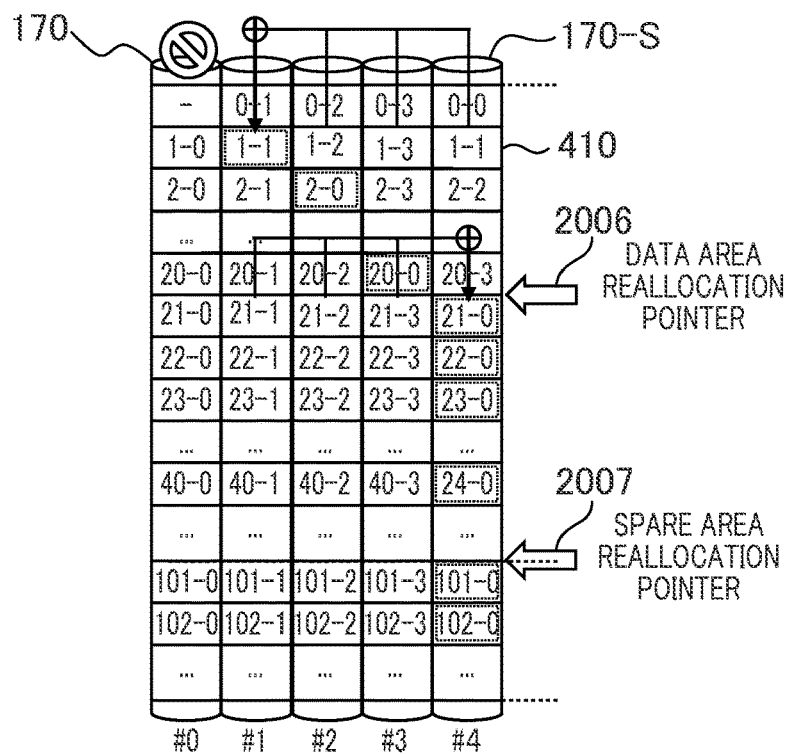
FIG. 25A is a diagram illustrating the state of a drive causing an error while moving from the D2D area according to the first embodiment of the present invention.
Figure 25B:
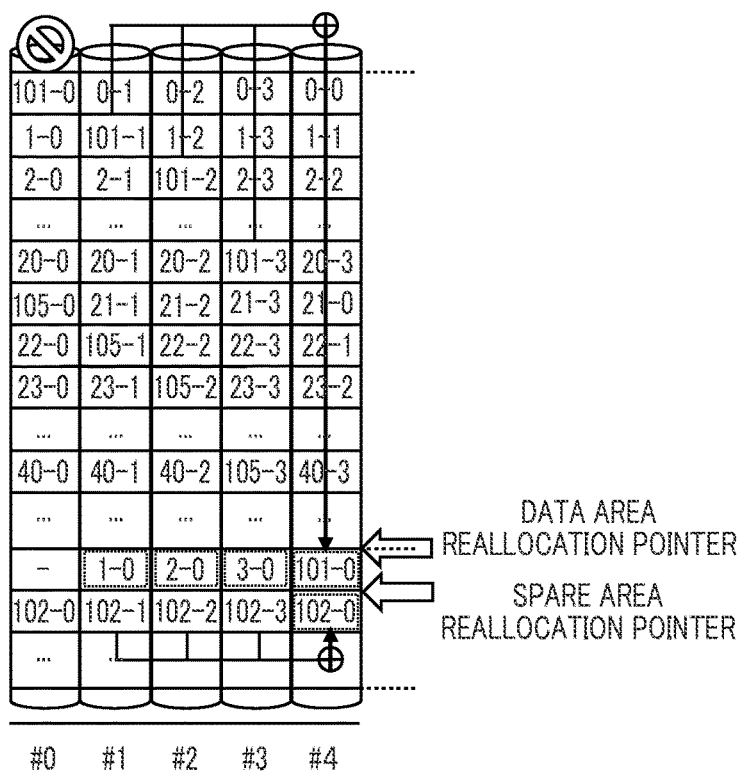
FIG. 25B is a diagram illustrating the state of a drive causing an error while moving from the D2S area according to the first embodiment of the present invention.

FIGS. 25A and 25B are diagrams illustrating states of the distributed RAID where the storage drive 170 (data drive #0 in the drawing) fails during the conversion process. FIG. 25A is a diagram illustrating a state of the distributed RAID where an error occurs during movement from the D2D area to the S2D area. FIG. 25B is a diagram illustrating a state of the distributed RAID where an error occurs during movement from the D2S area to the D2D area.

In FIGS. 25A and 25B, storage drive #0 in the drawing fails, and the rebuild program 1102 of the storage controller 100 starts the rebuild.

The rebuild program 1102 uses the data area reallocation pointer 2006 or the spare area reallocation pointer 2007 to determine which table to reference before and after the conversion from the RAID configuration to the distributed RAID configuration, and then rebuilds the data area for the group management table 1001.

During the conversion from the RAID configuration to the distributed RAID configuration, the rebuild program 1102 can reference the pre-conversion physical parcel management table 1004-1 and thereby restore the relationship between the physical parcel 410 and the physical storage device.

FIG. 25A illustrates a rebuild when storage drive #0 fails during reallocation of the physical parcel 410 in the D2D area to the S2D area. Before the conversion, storage drive #0 functions as a data drive to store data.

To recover data in the data area before conversion, the rebuild program 1102 acquires the data area reallocation pointer 2006 in the group management table 1001 and determines whether the column number precedes (to be higher than) or succeeds (to be lower than) the data area reallocation pointer 2006. The preceding column number (higher) signifies the state after conversion. Therefore, the post-conversion physical parcel management table 1004-2 is used to recover the physical parcel 410. According to the illustrated example, the rebuild program 1102 uses physical parcel "1-1" of storage drive #4 moved from data drive #1 and physical parcels "1-2" and "1-3" of storage drives #2 and 3 to restore physical parcel "1-1" and stores it in data drive #1 currently used as the spare area. Data recovery is unnecessary if storage drive #1 contains no data due to the movement from the D2D area to the S2D area.

In terms of the area succeeding (lower than) the data area reallocation pointer 2006, the rebuild program 1102 restores physical parcel "21-0," the data of storage drive #0, to storage drive #4 (S2D area) currently used as the spare area by using the pre-conversion physical parcel management table 1004-1 and the information about data drives #1 through #3.

When recovering data in the data area before conversion, the rebuild program 1102 does not lower the spare area reallocation pointer 2007 in the group management table 1001. Namely, the target column corresponds to a column number succeeding (lower than) the spare area reallocation pointer 2007. For example, the rebuild program 1102 uses physical parcels "102-1" through "102-3" of storage drives #1 through #3 to recover the physical parcel "102-0" of storage drive #0 and stores it in storage drive #4 currently used as the spare area.

The recovery method when an error occurs on the storage drive used as the data drive before conversion has been described. The recovery is simpler when an error occurs on storage drive #4 used as the spare drive before conversion. Column numbers preceding (higher than) the data area reallocation pointer 2006 store data. Therefore, the data recovery is performed similarly to the case where storage drive #0 fails. Otherwise, storage drive #4 contains no data and requires no recovery.

As above, when an error occurs during the first movement from the D2D area to S2D, data in failed data drive #0 is recovered and is stored in the spare area.

In FIG. 25B, data drive #0 fails while the D2S area is reallocated to the D2D area. The rebuild program 1102 rebuilds the pre-conversion data area 602 (D2D area) to spare drive #S.

The rebuild program 1102 acquires the spare area reallocation pointer 2007 in the group management table 1001. The earlier physical parcel 410 preceding the spare area reallocation pointer 2007 is empty and no recovery is needed.

At columns corresponding to the spare area reallocation pointer 2007, the physical parcel management table 1004 after the conversion is used to specify physical parcels "101-1" through "101-3" moved to the D2D area based on storage drives #1 through #3. Physical parcel "101-0" is accordingly recovered and is stored in storage drive #4 as the spare area.

At columns succeeding (lower than) the spare area reallocation pointer 2007, physical parcel "102-0" is recovered from physical parcels "102-1" through "102-3" and is stored in storage drive #4 as the spare area.

While the D2S area is reallocated to the D2D area, data drive #4 contains no data and therefore requires no recovery even if an error occurs.

As above, when an error occurs during the second movement from the D2S area to D2D, data of the failed storage drive #0 is restored to storage drive #4.

Figure 26:
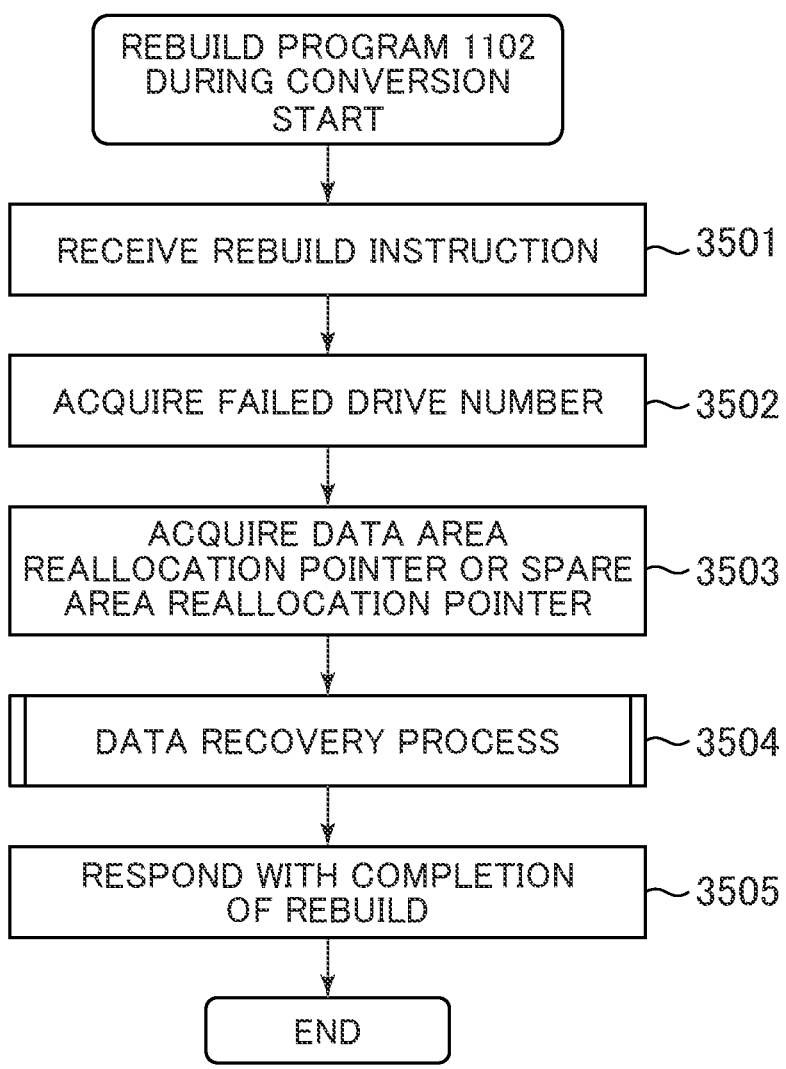
FIG. 26 is a flowchart illustrating a rebuild process during conversion according to the first embodiment of the present invention.

FIG. 26 is a flowchart illustrating the rebuild process performed during conversion to the distributed RAID configuration. This rebuild process is performed when the storage drive 170 fails during the conversion from the RAID configuration to the distributed RAID configuration.

The rebuild program 1102 may start automatically when the storage controller 100 detects an error. Alternatively, the abnormality detection may be notified to the management server 20, and the rebuild program 1102 may start based on a command from the management server 20. When the rebuild program 1102 starts, the protection system conversion program 1101 stops.

At step 3501, the storage controller 100 starts the rebuild program 1102 based on the above-described trigger. The rebuild program 1102 acquires the identifier of the failed storage drive 170. The failed drive can be notified from an error detection program (unshown) or the OS of the storage controller 100.

The rebuild program 1102 references the physical parcel management table 1004 based on the identifier (PDEV #) of the storage drive 170, acquires the physical parcel number (P-Parcel #) 2032, and acquires the identifier (Parcel Group

2051) of the parcel group 400 based on the physical parcel number in the parcel group management table 1006. In addition, the rebuild program 1102 references the group management table 1001, searches for PPG #2001 based on the identifier of the parcel group 400, and acquires the data area reallocation pointer 2006 and the spare area reallocation pointer 2007.

At step 3504, the rebuild program 1102 performs the data recovery process. The rebuild program 1102 performs this process as described later by determining during which of the first movement and the second movement the error has occurred in the process of the conversion to the distributed RAID configuration as illustrated in FIGS. 25A and 25B.

When the rebuild process is completed, at step 3505, the rebuild program 1102 notifies the management server 20 or an error detection program of the storage controller 100 that the rebuild process is completed.

Figure 27:
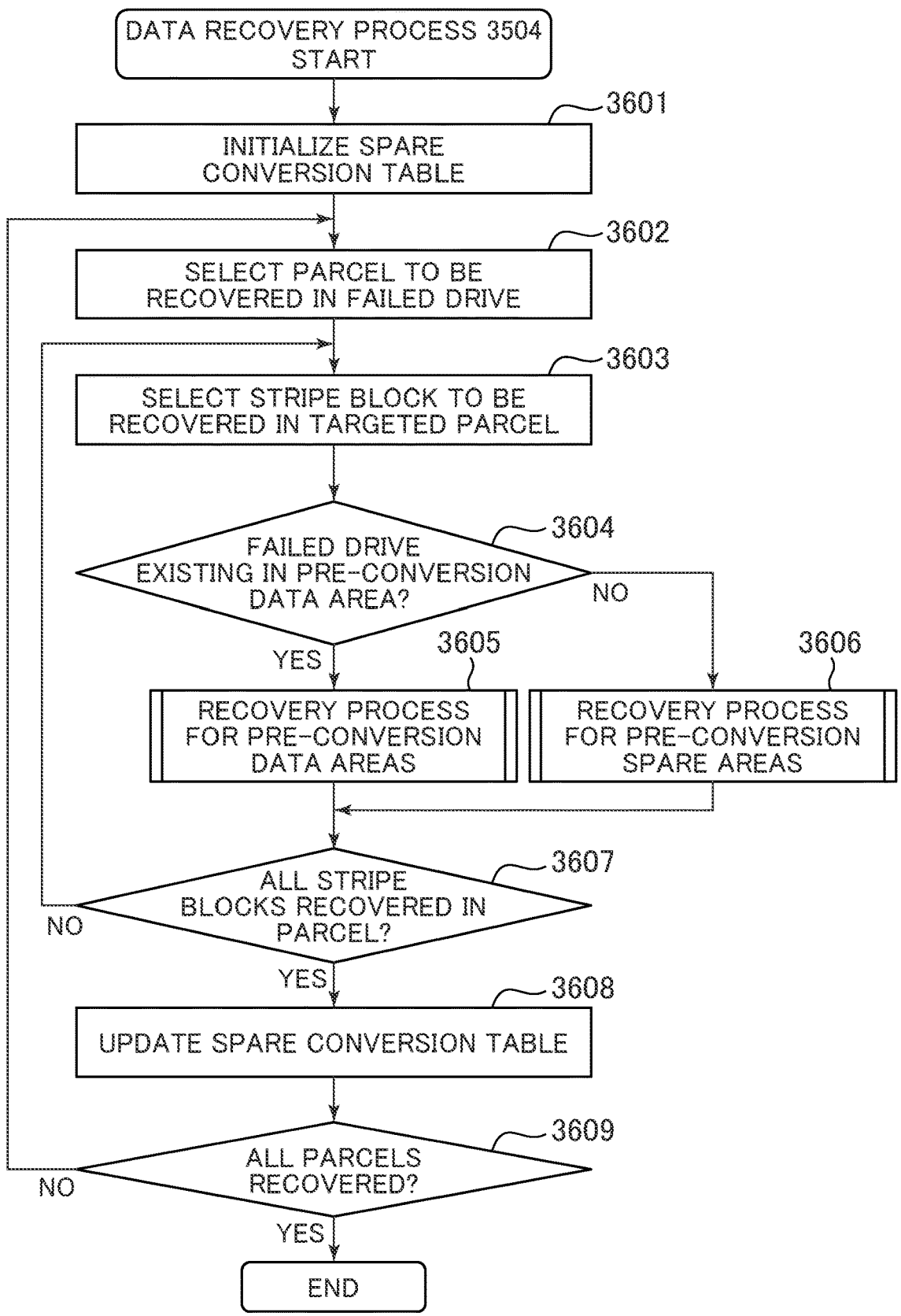
FIG. 27 is a flowchart illustrating a data recovery process according to the first embodiment of the present invention.

FIG. 27 is a flowchart illustrating the data recovery process performed at step 3504 of FIG. 26. At step 3601, the rebuild program 1102 initializes (clears) the spare conversion table 1007 (FIG. 14).

At step 3602, the rebuild program 1102 selects the physical parcel 410 of the failed storage drive 170 (hereinafter referred to as the failed drive). The protection system conversion program 1101 terminates the process when an error occurs. For example, the pre-conversion physical parcel management table 1004-1 retains the state before the error occurrence.

The rebuild program 1102 then acquires P-Parcel #2032 as the identifier of the physical parcel 410 in the failed drive from the entry of PDEV #2031 corresponding to the identifier of the failed drive in the pre-conversion physical parcel management table 1004-1.

The rebuild program 1102 references the physical device management table 1002 and acquires PPG #2011 from the entry of PDEV #2012 corresponding to the failed drive to identify the parcel group 400.

It may be advantageous to sequentially select the physical parcels 410 (see FIG. 19) from the beginning of the storage area, for example.

At step 3603, the rebuild program 1102 selects the stripe block 201 illustrated in FIG. 6 in the selected physical parcel 410 and identifies the stripe 401 to which the stripe block 201 belongs.

At step 3604, the rebuild program 1102 determines whether the selected stripe block 201 exists in the data area (such as D2D area or D2S area) before the change or the spare area (such as S2S area or S2S area) before the change.

To perform this determination, the rebuild program 1102 references the post-conversion physical parcel management table 1004-2 and determines whether the identifier of the currently selected physical parcel 410 exists in the entry of PDEV #2031 for storage drive #4 or another storage drive.

If the identifier of the currently selected physical parcel 410 does not exist in storage drive #4, it is possible to determine that the physical parcel 410 is not completely moved from the D2D area to the S2D area. In this case, the rebuild program 1102 proceeds to step 3605 to perform a recovery process for pre-conversion data areas.

If the identifier of the currently selected physical parcel 410 exists in storage drive #4, it is possible to determine that the physical parcel 410 is completely moved from the D2D area to the S2D area. In this case, the rebuild program 1102 proceeds to step 3606 to perform a recovery process for pre-conversion spare areas.

At step 3607, the rebuild program 1102 determines whether the recovery is completed for all stripe blocks 201 in the currently selected physical parcel 410. If the rebuild process is complete, the rebuild program 1102 proceeds to step 3608. If there remains an incomplete stripe block 201, control returns to step 3603 and the above-described process is repeated.

At step 3608, the rebuild program 1102 updates the spare conversion table 1007. To update the spare conversion table 1007, the rebuild program 1102 stores identifiers of the physical device and the physical parcel 410 as the rebuild source (restoration target) in PDEV #2061 and P-Parcel #2062 corresponding to Source in the spare conversion table 1007 and stores identifiers of the physical device and the physical parcel 410 as the rebuild destination (restoration destination) in PDEV #2063 and P-Parcel #2064 corresponding to Destination.

At step 3609, the rebuild program 1102 determines whether the recovery is completed for all physical parcels 410 in the failed drive. If the recovery is completed, the process terminates. If there remains an incomplete physical parcel 410, control returns to step 3602 and the process is repeated.

Figure 28:
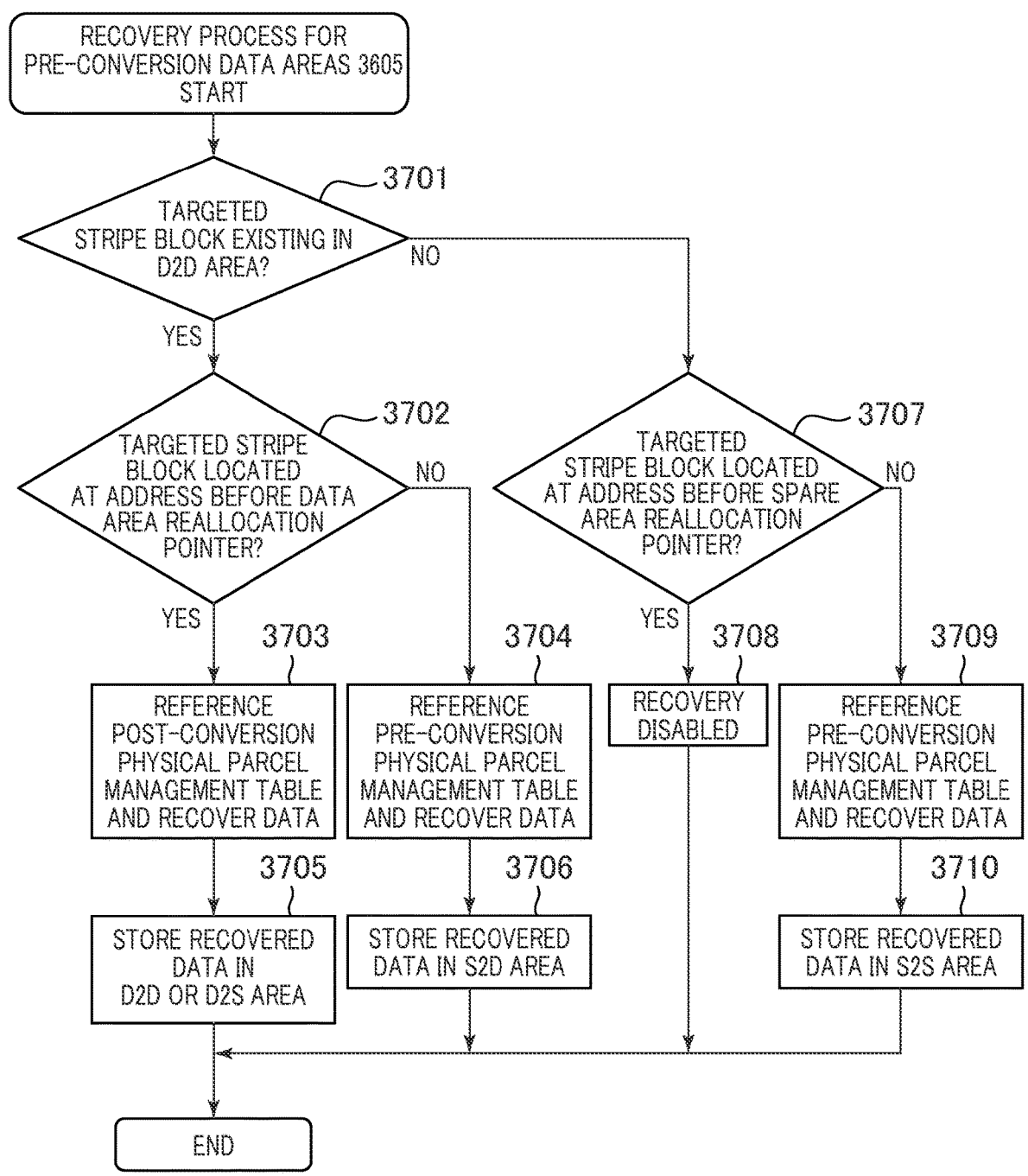
FIG. 28 is a flowchart illustrating a recovery process for pre-conversion data areas according to the first embodiment of the present invention.

FIG. 28 is a flowchart illustrating the recovery process for pre-conversion data areas. This process is performed at step 3605 in FIG. 27.

At step 3701, the rebuild program 1102 determines whether the stripe block 201 selected at step 3605 above exists in the D2D area. If the stripe block 201 exists in the D2D area, control proceeds to step 3702. If the stripe block 201 exists in the D2S area, control proceeds to step 3707.

At step 3702, the rebuild program 1102 determines whether the stripe block 201 to be recovered exists in the physical parcel 410 before the data area reallocation pointer 2006. If the stripe block 201 exists before the data area reallocation pointer 2006, control proceeds to step 3703. If the stripe block 201 exists after the data area reallocation pointer 2006, control proceeds to step 3704.

At step 3703, the rebuild program 1102 references the post-conversion physical parcel management table 1004-2 and recovers data of the sub-block 200 based on data and parity of the normal data drive.

At step 3705, the rebuild program 1102 references the pre-conversion physical parcel management table 1004-1 and stores the recovered data in the physical parcel 410 of the data drive before the movement. The process at steps 3704 and 3705 is illustrated in FIG. 25A.

Step 3704 applies to the case where the stripe block 201 to be recovered exists after the data area reallocation pointer 2006. In this case, the rebuild program 1102 references the pre-conversion physical parcel management table 1004-1 and recovers data of the sub-block 200 based on data and parity of the normal storage drive.

At step 3706, the rebuild program 1102 stores the recovered data in the physical parcel 410 of the S2D area after the data area reallocation pointer 2006. The process at steps 3704 and 3705 is as illustrated in FIG. 25A.

The determination at step 3701 above may indicate that the stripe block 201 to be recovered does not exist in the D2D area. Then, at step 3707, the rebuild program 1102 determines whether the stripe block 201 exists in the physical parcel 410 before the spare area reallocation pointer 2007.

If the stripe block 201 exists before the spare area reallocation pointer 2007, the rebuild program 1102 proceeds to step 3708. If the stripe block 201 exists after the spare area reallocation pointer 2007 or later, control proceeds to step 3709.

At step 3708, no recovery is required because the above-described rebuild process recovers the area before the spare area reallocation pointer 2007 to storage drive #4.

Step 3709 applies to the case where the stripe block 201 to be recovered exists after the data area reallocation pointer 2006. The rebuild program 1102 references the pre-conversion physical parcel management table 1004-1 and recovers data of the sub-block 200 based on data and parity of the normal storage drive.

At step 3710, the rebuild program 1102 stores the recovered data in the physical parcel 410 of the S2S area after the data area reallocation pointer 2006. The process at steps 3704 and 3705 is illustrated in FIG. 25B.

Figure 29:
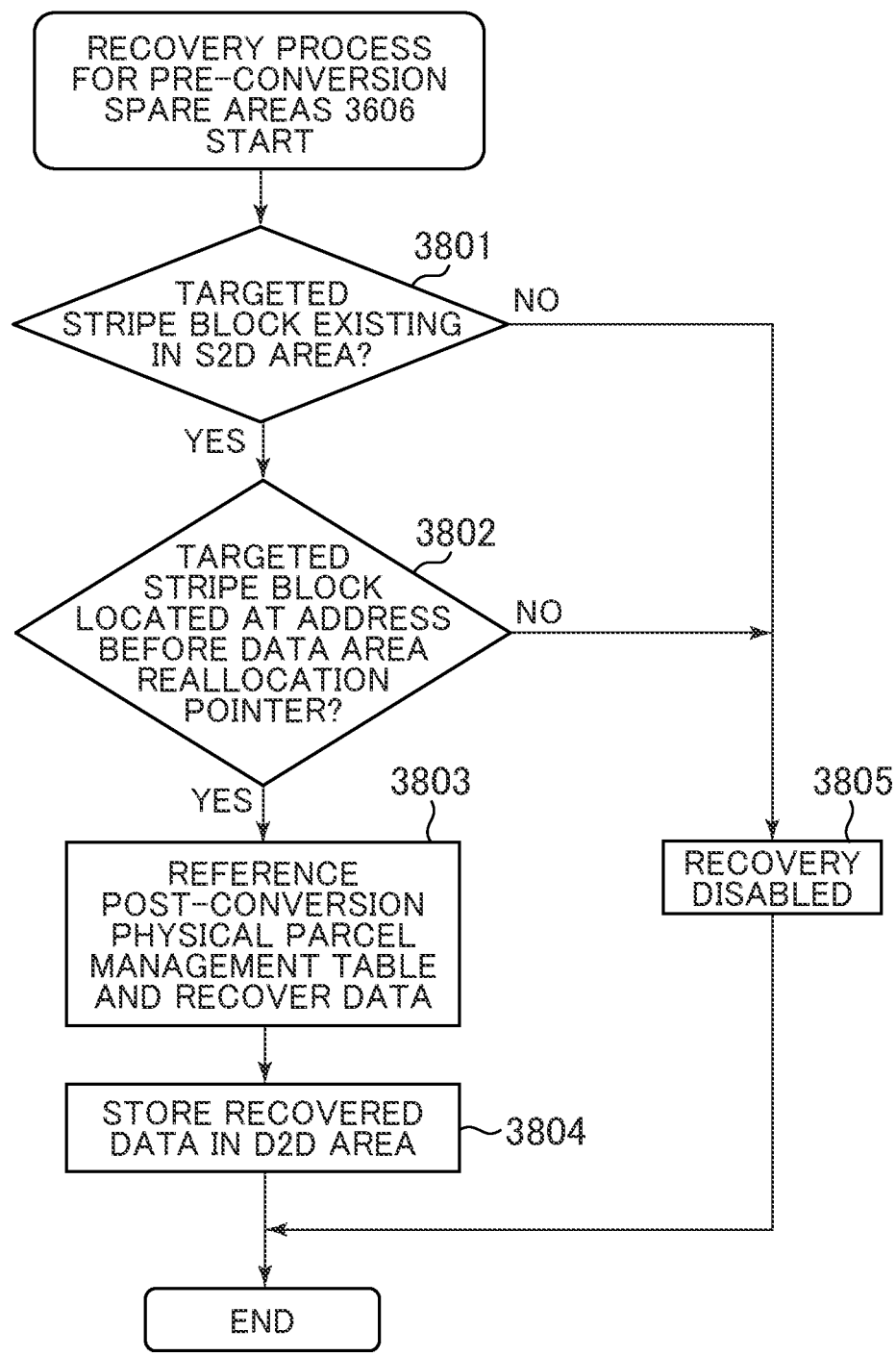
FIG. 29 is a flowchart illustrating a recovery process for pre-conversion spare areas according to the first embodiment of the present invention.

FIG. 29 is a flowchart illustrating the recovery process for pre-conversion spare areas. This process is performed at step 3606 of FIG. 27.

At step 3801, the rebuild program 1102 determines whether the stripe block 201 selected at step 3605 exists in the S2D area. If the stripe block 201 exists in the S2D area, control proceeds to step 3802. If the stripe block 201 exists in the D2D area or the D2S area, control proceeds to step 3805.

At step 3802, the rebuild program 1102 determines whether the stripe block 201 to be recovered exists in the physical parcel 410 before the data area reallocation pointer 2006. If the stripe block 201 exists before the data area reallocation pointer 2006, control proceeds to step 3803. If the stripe block 201 exists after the data area reallocation pointer 2006, control proceeds to step 3805.

At step 3803, the rebuild program 1102 references the post-conversion physical parcel management table 1004-2 and recovers data of the stripe block 201 based on data and parity of the normal storage drive.

At step 3804, the rebuild program 1102 references the pre-conversion physical parcel management table 1004-1 and stores the recovered data in the physical parcel 410 for the spare area of the D2D area before the movement. The process at steps 3804 and 3805 is illustrated in FIG. 25A.

Suppose the storage drive 170 (data drive) fails during conversion from the traditional RAID configuration to the distributed RAID configuration. Then, the protection system conversion program 1101 stops to stop the conversion and the rebuild program 1102 restores the contents of the failed drive to spare drive #S according to the above-described process. The protection system conversion program 1101 moves the physical parcel 410 other than the failed drive to the S2D area and the physical parcel 410 is then written back to the physical parcel 410 as the movement source based on the pre-conversion physical parcel management table 1004.

Figure 30:
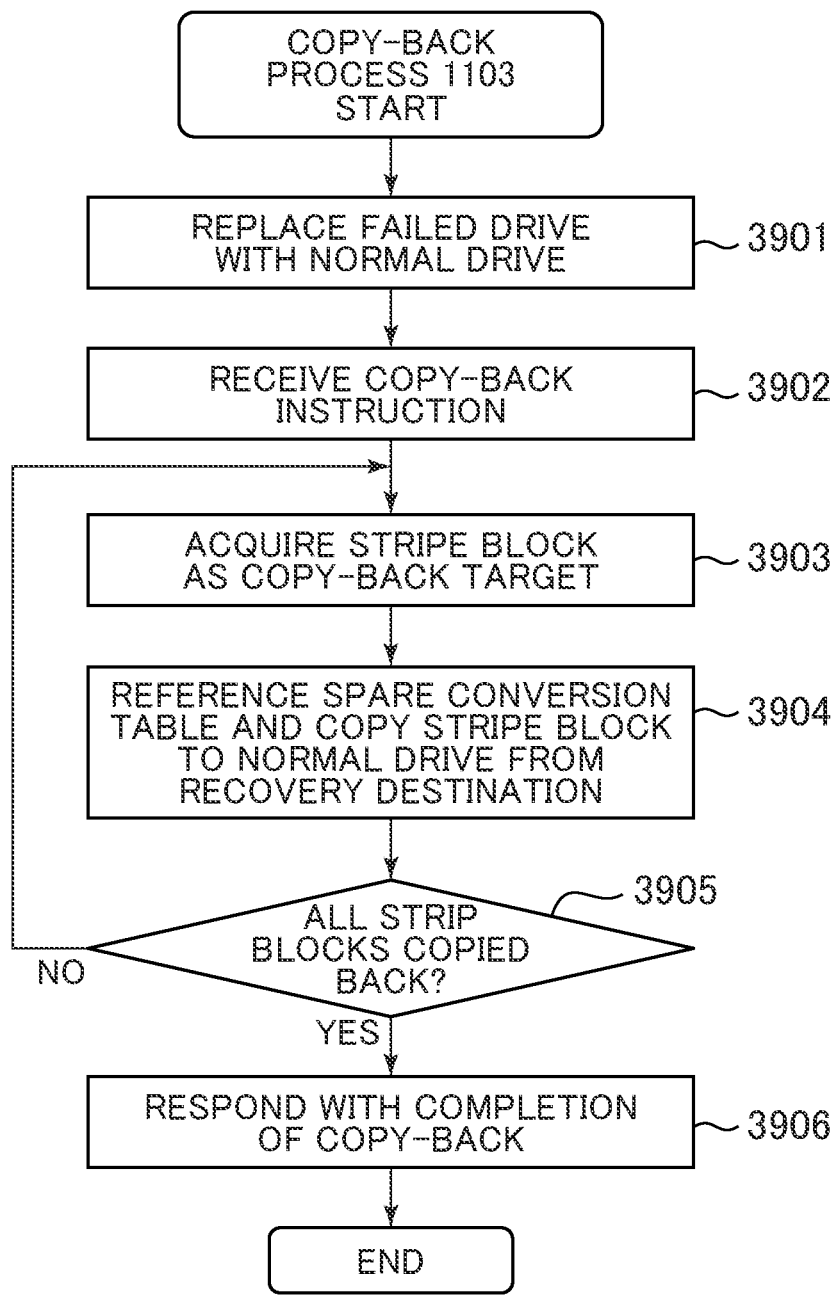
FIG. 30 is a flowchart illustrating a copy-back process according to the first embodiment of the present invention.

FIG. 30 is a flowchart illustrating a copy-back process. This process is performed based on a command from the management server 20, for example, after the failed drive is replaced by the normal storage drive 170.

The failed drive is replaced by the normal storage drive 170 (3901). The storage controller 100 then receives a copy-back start command from the management server 20, for example (3902). Based on the copy-back start command, the storage controller 100 starts the copy-back program 1103.

The physical parity group 310 or the virtual parity group 300 is specified in the copy-back command. The copy-back program 1103 searches the physical device management table 1002 in the physical parity group 310 and selects the storage drive 170 to be copied back.

At step 3903, the copy-back program 1103 acquires the stripe block 201 to be copied back from the spare area. At step 3904, the copy-back program 1103 references the spare conversion table 1007 and copies the stripe block 201 from the spare area as the recovery destination to PDEV #2061 as Source.

At step 3905, the copy-back program 1103 determines whether the copy-back is completed on all stripe blocks 201 in spare drive #S. If the copy-back is completed, control proceeds to step 3906. If there remains an incomplete stripe block 201, control returns to step 3903 and the above-described process is repeated.

At step 3906, the copy-back program 1103 notifies the management server 20 of completion of the copy-back and terminates the process.

If the storage drive 170 fails during the copy-back process, the copy-back process is interrupted and the rebuild process is performed. To restart the conversion process after the rebuild is completed, it is necessary to first perform the above-described copy-back process to return to the state immediately before the storage drive 170 fails. The conversion process may be automatically restarted upon completion of the copy-back process or may be restarted based on an instruction from the management server 20.

Figure 31:
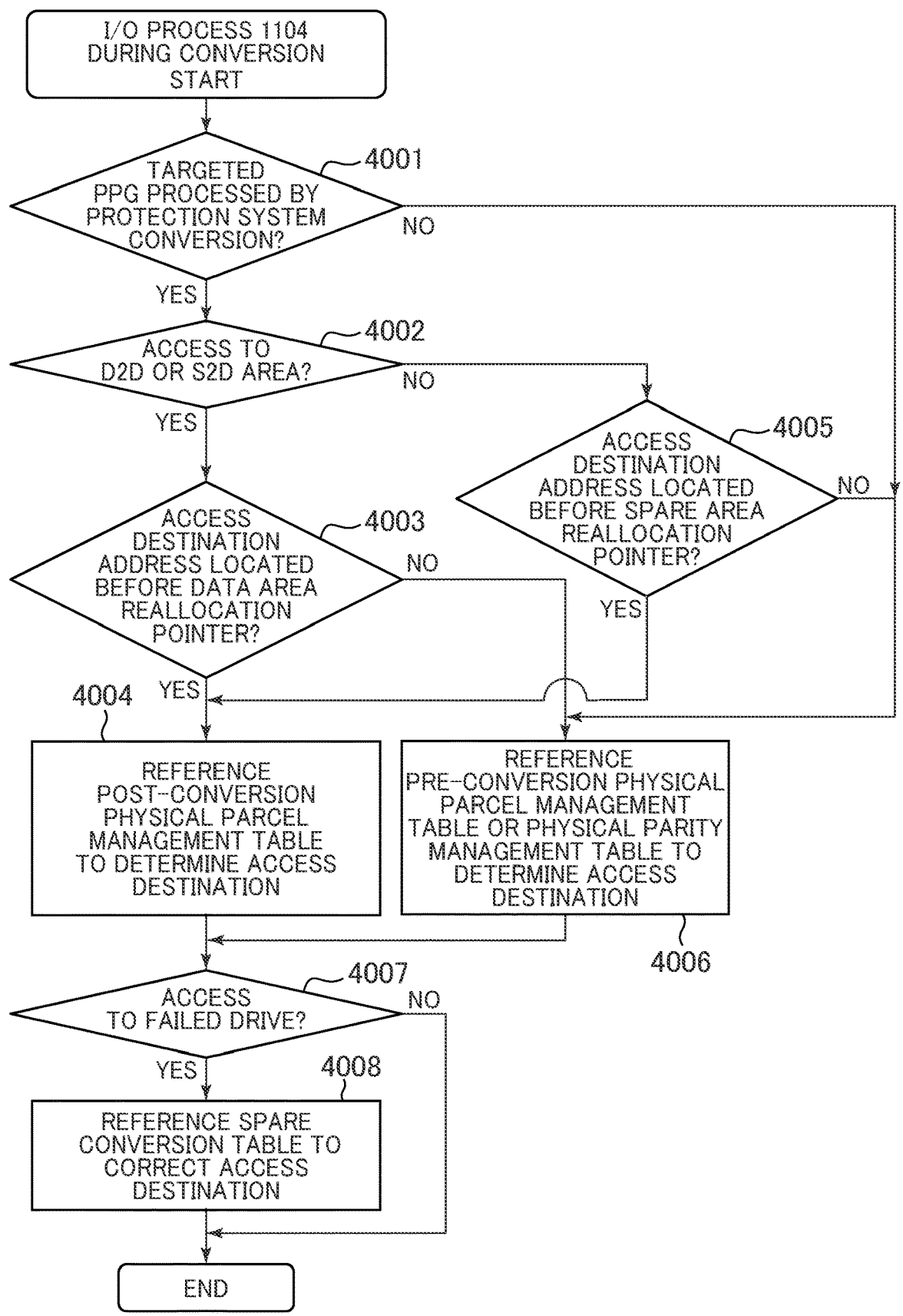
FIG. 31 is a flowchart illustrating an I/O process during conversion according to the first embodiment of the present invention.

FIG. 31 is a flowchart illustrating an I/O process during conversion. The I/O processing program 1104 executes this process when the storage controller 100 accepts I/O access from the host 10 during the conversion process from the RAID configuration to the distributed RAID configuration.

At step 4001, the I/O processing program 1104 references the group management table 1001 and determines whether the physical parity group 310 as an access destination of the I/O request is being converted. If the physical parity group 310 as the access destination is being converted, control proceeds to step 4002. Otherwise, control proceeds to step 4006.

At step 4002, the I/O processing program 1104 references the physical parcel management table 1004 and determines whether the physical parcel 410 as an access destination of the I/O request exists in the post-conversion data area 604. If the physical parcel 410 as the access destination exists in the post-conversion data area 604, the I/O processing program 1104 proceeds to step 4003. If the physical parcel 410 exists in the post-conversion spare area 605, control proceeds to step 4005.

At step 4003, the I/O processing program 1104 references the group management table 1001 and acquires the data area reallocation pointer 2006 and spare area reallocation pointer 2007 for the parcel group 400. The I/O processing program 1104 determines whether the address of the physical parcel 410 as the access destination precedes the data area reallocation pointer 2006. If the access destination precedes the data area reallocation pointer 2006, the I/O processing program 1104 proceeds to step 4004. If the access destination succeeds the data area reallocation pointer 2006, control proceeds to step 4006.

The determination at step 4002 may indicate that the access destination is the post-conversion spare area 605. Then, at step 4005, the I/O processing program 1104 determines whether the access destination precedes the spare area reallocation pointer 2007. If the access destination precedes the spare area reallocation pointer 2007, the I/O processing program 1104 proceeds to step 4005. If the access destination succeeds the spare area reallocation pointer 2007, control proceeds to step 4006.

At step 4004, the I/O processing program 1104 references the post-conversion physical parcel management table 1004-2 to determine the physical device to be accessed. At step 4006, the I/O processing program 1104 references the pre-conversion physical parcel management table 1004-1 to determine the physical device to be accessed. If the access target is the physical parity group 310 that is not being converted, a physical parity management table (unshown) is referenced to determine the physical device.

At step 4007, the I/O processing program 1104 references the physical device management table 1002 to determine whether the physical device being accessed is a failed drive. If the physical device being accessed is a failed drive, control proceeds to step 4008. If the physical device being accessed is normal, the I/O processing program 1104 performs an I/O process on the access destination and responds to host 10.

If the access destination is a failed drive, the I/O processing program 1104 references the spare conversion table 1007, corrects PDEV #2061 of Source to PDEV #2064 of Destination, performs an I/O process, and responds to the host 10.

Even when an I/O request is accepted during conversion from the RAID configuration to the distributed RAID configuration, the above-described process enables an I/O process through the use of the physical parcel management table 1004 before and after the conversion. Even when an error occurs during the conversion, the reference to the spare conversion table 1007 enables an I/O process to be performed.

As above, when the conventional RAID configuration is converted to the distributed RAID configuration, the present embodiment first adds spare drive #S to the parity group. Then, as the first movement, the storage controller 100 moves the physical parcel 410 of the D2D area to the S2D area for the added spare drive #S and generates a free area in the existing data area (D2D). As the second movement, the storage controller 100 moves the physical parcel of the D2S area to the free area of the D2D area and changes it to the spare area after the conversion.

The above-described process makes it possible to easily convert the conventional RAID configuration to the distributed RAID configuration and expand the redundancy expansion and the availability together.

The RAID configuration is converted to the distributed RAID configuration in units of parcels instead of stripes according to the conventional RAID configuration. Therefore, it is possible to prevent loads from being concentrated on the single storage drive 170 and allow fast transition to the distributed RAID configuration.

An attempt to convert the conventional RAID configuration as is to the distributed RAID configuration necessitates data and parity to be allocated to the different storage drives 170. Therefore, the conversion may be unsuccessful due to the concentration of parities on one drive, for example. The storage controller 100 may require a large amount of calculation to avoid uneven distribution of parities.

Meanwhile, the use of parcels allows a parcel to contain the parity and data at a given ratio. It is possible to reliably prevent uneven distribution of parities and smoothly perform the conversion to the distributed RAID configuration.

Second Embodiment

Figure 32A:
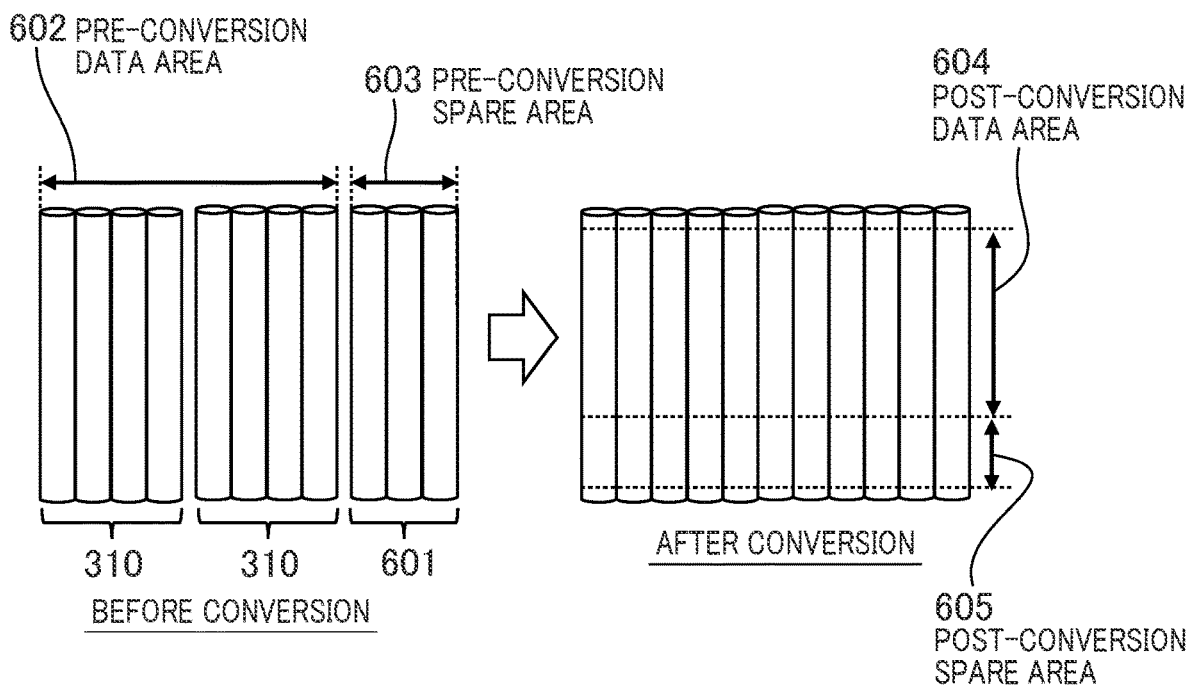
FIG. 32A is a diagram illustrating the relationship between a data area and a spare area before and after conversion according to a second embodiment of the present invention.
Figure 32B:
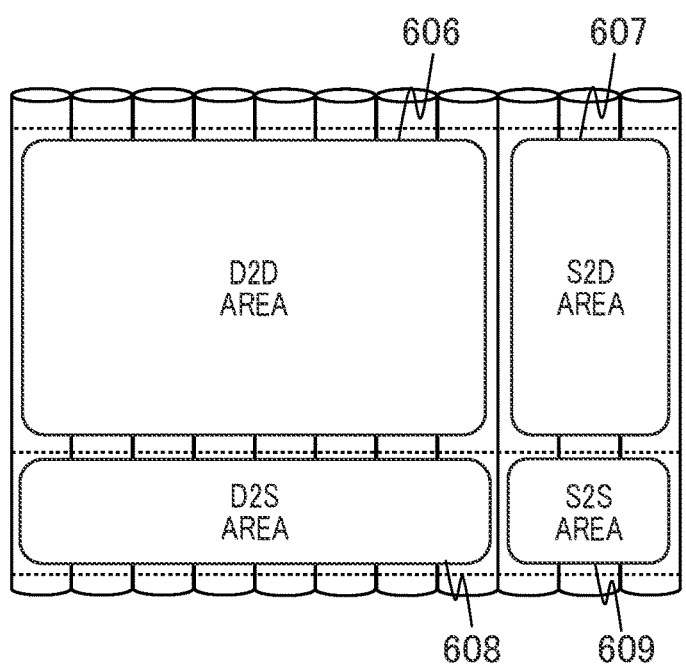
FIG. 32B is a diagram illustrating the relationship between the data area and the spare area after conversion according to the second embodiment of the present invention.

FIGS. 32A and 32B illustrate the second embodiment of the present invention. FIG. 32A is a diagram illustrating the relationship between the data area and the spare area before and after the conversion. FIG. 32B is a diagram illustrating the relationship between the data area and the spare area after the conversion.

The second embodiment provides an example of adding three spare drives 601 to two physical parity groups 310 based on 3D1P to convert to the single distributed RAID configuration including 11 drives.

All the conventional physical parity groups 310 before conversion need to ensure the same protection level (such as RAID5). For example, 3D1P and 2D2P or 3D1P and 4D1P cannot mix.

The post-conversion spare area 605 illustrated in FIG. 32B has the capacity comparable to the added spare drives 601 (three drives in the example) but may be used as a data area sized enough to ensure the spare capacity comparable to one or more drives after the conversion.

The conversion method from the two physical parity groups 310 to one distributed RAID configuration and the rebuild process can be performed similarly to the first embodiment. There may occur chain-reaction movement such as moving from the D2D area to the D2D area and then to the S2D area depending on the mapping of the physical parcel management table 1004 before and after the conversion.

As above, the second embodiment can also provide effects similar to those of the first embodiment.

The present invention is not limited to the above-mentioned embodiments and includes various modifications. For example, the embodiments are described in detail to explain the present invention in an easy-to-understand fashion. The present invention is not necessarily limited to all the configurations described above. It is possible to replace part of the configuration of one embodiment with the configuration of another embodiment. The configuration of one embodiment can additionally include the configuration of other embodiments. Further, part of the configuration of each embodiment can be subject to one of or a combination of addition, deletion, and replacement of other configurations.

Some or all of the above-described configurations, functions, processing portions, and processing means, for example, may be embodied as hardware by designing integrated circuits, for example. The above-described configurations and functions, for example, may be embodied as software by allowing the processor to interpret and execute programs that provide the functions. Information such as programs, tables, and files to embody the functions can be stored in recording devices such as memory, hard disks, and SSD (Solid State Drive), or recording media such as IC cards, SD cards, and DVDs.

There have been described the control lines and information lines that are considered necessary for the explanation. Not all control lines and information lines as a product are illustrated. In practice, almost all configurations may be considered to be interconnected.

What is claimed is:

1. A storage system comprising:
   a storage controller including a processor and memory; and
   a plurality of storage drives,
   wherein parity data is generated from a plurality of user data pieces of user data and a stripe is composed of the plurality of user data pieces and the parity data;
   wherein data, including the plurality of user data pieces and the parity data, belonging to the stripe is stored in different storage drives;
   wherein a first parity group is composed of a plurality of stripes and is allocated with storage drives of the plurality of storage drives to store the first parity group;
   wherein the first group allows a number of storage drives allocated to the first parity group to be equal to a number of data pieces configuring each stripe;

wherein a second parity group allows the number of storage drives allocated to the second parity group to be larger than the number of data pieces configuring each stripe and allows data for each stripe to be distributed and stored in different combinations of storage drives;

wherein when the first parity group is converted to the second parity group, the storage controller:

adds another storage drive to be allocated to the first parity group;

moves data pieces belonging to different stripes from each of the storage drives to the added another storage drive; and moves data in each of the storage drives to aggregate a free area resulting from movement of the data pieces in the storage drives, wherein a sequence of storage positions are defined in each of the storage drives;

wherein the first parity group allows data belonging to the same stripe to be stored at storage positions in the same sequence;

wherein conversion from the first parity group to the second parity group moves a data piece, belonging to the same stripe, to a storage position of the added storage drive in the same sequence; and wherein data stored at storage positions in another sequence is moved to the free area resulting from the movement of the data in the storage drives to provide the free area.

2. The storage system according to claim 1, wherein the free area is a spare area to store recovered data when the storage drive fails.

3. The storage system according to claim 1, wherein the plurality of stripes form a plurality of parcels and the parcel contains a plurality of data pieces belonging to different stripes; and wherein data pieces are moved in units of the parcels.

4. The storage system according to claim 3, wherein the parcel contains the user data and the parity data as the data at a predetermined ratio.

5. The storage system according to claim 1, wherein the storage drive uses mapping to manage the storage position provided to the storage controller and a storage position on storage media; and wherein mapping is changed to move data in the storage drive without moving data on storage media.

6. The storage system according to claim 1, wherein a storage position to store data after the conversion and a storage position for the free area are predetermined;

wherein data is moved between the storage drives at a storage position to store data after the conversion; and wherein a storage position corresponding to the free area after the conversion allows data to be moved in a storage drive so that the data stored at the storage position is moved to a storage position corresponding to the free area resulting from data movement between the storage drives.

7. The storage system according to claim 6, wherein the conversion from the first parity group to the second parity group is performed in the same sequence of storage positions of the data and a progress pointer indicating the same sequence manages the progress; and wherein, when a storage drive error occurs during the conversion, a response to the error is determined based on the progress pointer.

8. The storage system according to claim 7, wherein, when the storage drive fails during data movement between storage devices, data of another storage drive is used to recover data of the failed storage drive at a storage position corresponding to completion indicated by the progress pointer and recovered data is stored in the free area corresponding to the storage position; and data of another storage drive is used to recover data of the failed storage drive at a storage position corresponding to incompletion indicated by the progress pointer and recovered data is stored in the added storage drive.

9. The storage system according to claim 7, wherein, when the storage drive fails while data is being moved in the storage device and after a conversion is completed, data in another storage drive is used to recover data in the failed storage drive and recovered data is stored at a storage position used as the free area after the conversion.

10. A control method in a storage system that includes a storage controller including a processor and memory and a plurality of storage drives, comprising the steps of:

generating parity data from a plurality of user data pieces of user data and composing a stripe out of the plurality of user data pieces and the parity data;

storing data, including the plurality of user data pieces and the parity data, belonging to the stripe is stored in different storage drives; and composing a first parity group out of the plurality of stripes and allocating storage drives of the plurality of storage drives to store the first parity group, wherein the first parity group allows a number of storage drives allocated to the first parity group to be equal to a number of data pieces configuring each stripe;

wherein a second parity group allows the number of storage drives allocated to the second parity group to be larger than the number of data pieces configuring each stripe and allows data for each stripe to be distributed and stored in different combinations of storage drives;

wherein when the first parity group is converted to the second parity group, the storage controller: adds another storage drive to be allocated to the second parity group;

moves data pieces belonging to different stripes from each existing storage drive to the added another storage drive; and moves data in each of the storage drives to aggregate a free area resulting from movement of the data pieces in the storage drives, wherein a sequence of storage positions are defined in each of the storage drives;

wherein the first parity group allows data belonging to the same stripe to be stored at storage positions in the same sequence;

wherein conversion from the first parity group to the second parity group moves a data piece, belonging to the same stripe, to a storage position of the added storage drives in the same sequence; and wherein data stored at storage positions in another sequence is moved to the free area resulting from the movement of the data in the storage drives to provide the free area.

* * * * *